US007301467B2

(12) United States Patent
Ishimura et al.

(10) Patent No.: US 7,301,467 B2
(45) Date of Patent: Nov. 27, 2007

(54) POSITION DETECTION SYSTEM, POSITION DETECTION METHOD THEREFOR, POSITION DETECTION COMMUNICATION DEVICE, AND COMMUNICATION DEVICE

(75) Inventors: Shizuka Ishimura, Gunma-ken (JP); Akira Iketani, Gunma-ken (JP)

(73) Assignee: Sanyo Electric Co., Ltd., Osaka (JP)

( * ) Notice: Subject to any disclaimer, the term of this patent is extended or adjusted under 35 U.S.C. 154(b) by 219 days.

(21) Appl. No.: 11/254,028

(22) Filed: Oct. 18, 2005

(65) Prior Publication Data

US 2006/0094350 A1    May 4, 2006

(30) Foreign Application Priority Data

Oct. 19, 2004  (JP)  ............................. 2004-304762

(51) Int. Cl.
*G08B 21/00* (2006.01)
(52) U.S. Cl. ...................... 340/644; 340/435; 340/901; 340/539.1; 455/7
(58) Field of Classification Search ................ 340/644, 340/658, 545.1, 542, 568.1, 571, 545.6, 506, 340/545.7, 539, 545.8, 545.9, 901–905, 911, 340/435, 539.1; 455/7
See application file for complete search history.

(56) References Cited

U.S. PATENT DOCUMENTS

| 6,803,851 | B1 * | 10/2004 | Kramer et al. ............. 340/5.61 |
| 2002/0024660 | A1 | 2/2002 | Ghosh |
| 2003/0090365 | A1 | 5/2003 | Bergerhoff |

FOREIGN PATENT DOCUMENTS

| DE | 19839695 C1 | 5/2000 |
| EP | 1428694 A | 6/2004 |
| JP | 2000-198420 | 7/2000 |
| WO | WO 2004-051581 | 6/2004 |
| WO | WO 2004-053522 A | 6/2004 |

OTHER PUBLICATIONS

European Search Report, Feb. 16, 2006, Reference PJC/G26971EP, App EP 05256473.9-2220.

* cited by examiner

*Primary Examiner*—Benjamin C. Lee
*Assistant Examiner*—Daniel Previl
(74) *Attorney, Agent, or Firm*—SoCal IP Law Group LLP; Steven C. Sereboff

(57) ABSTRACT

In a position detection system, a plurality of first communication devices each comprise a transmitter for transmitting a distance-calculation signal for calculating distance to the second communication device; a detector for detecting, by receiving from the second communication device a signal corresponding to the distance-calculation signal, phase difference between the distance-calculation signal when transmitted and the signal corresponding to the distance-calculation signal when received; and a calculator for calculating the distance to the second communication device, based on the phase difference. A second communication device comprises a transmitter for transmitting the signal corresponding to the distance-calculation signal. The position detection system comprises a determining unit for determining whether the multiple distances are below a predetermined distance; and a position detector for detecting the position of a relay device corresponding to the multiple distances when the determining unit has determined that the multiple distances are at or above the predetermined distance.

15 Claims, 9 Drawing Sheets

POSITION DETECTION SYSTEM, POSITION DETECTION METHOD THEREFOR, POSITION DETECTION COMMUNICATION DEVICE, AND COMMUNICATION DEVICE

CROSS-REFERENCE TO RELATED APPLICATIONS

The present application claims priority from Japanese Patent Application No. 2004-304762 filed on Oct. 19, 2004, which is herein incorporated by reference.

BACKGROUND OF THE INVENTION

1. Field of the Invention

The present invention relates to position detection systems, position detection methods therefor, position detection communication devices, and communication devices.

2. Description of the Related Art

In these years, among communication devices that communicate with each other to perform prescribed processing are, for example, vehicle-mounted and mobile devices for vehicles having a passive keyless entry system mounted therein.

Communication between the vehicle-mounted device and the mobile device for a vehicle with a passive keyless entry system installed is described in detail below. The vehicle-mounted device is installed, for example, in the door on the driver-seat side of the vehicle, and the mobile device is carried by the owner (hereinafter referred to as the wearer) of the vehicle concerned. After stopping the vehicle engine, the wearer opens the door and exits the vehicle.

The vehicle-mounted device transmits a signal (hereinafter referred to as signal A) in order to determine whether or not the mobile device is within a range (area) where communication between the vehicle-mounted device and the mobile device is feasible. When the wearer is within a communication-feasible range, the mobile device receives the signal A from the vehicle-mounted device, and transmits a signal B in response to this signal A. When the vehicle-mounted device receives the signal B from the mobile device, it determines that the mobile device is within the communication-feasible range. Transmission of the signal A from the vehicle-mounted device is repeated at prescribed intervals.

If the wearer goes outside the communication-feasible range, the mobile device is no longer able to receive the signal A from the vehicle-mounted device. As a result, the vehicle-mounted device can no longer receive the signal B from the mobile device in response to the signal A. When, for example, the vehicle-mounted device no longer receives the signal B from the mobile device within a predetermined time period, it transmits an instruction signal to a controller, separately installed inside the vehicle, to lock the doors of the vehicle. The controller locks the doors of the vehicle, according to the instruction signal from the vehicle-mounted device. Thus, when the wearer moves away from the vehicle and the mobile device is outside the communication-feasible range, the doors of the vehicle are locked.

Next, in cases where, having moved outside the communication-feasible range, the wearer returns to within the communication-feasible range, the mobile device again receives the signal A from the vehicle-mounted device. The mobile device transmits the signal B. When the vehicle-mounted device receives the signal B from the mobile device, in order to determine whether or not the mobile device relates to this vehicle, it transmits a read signal, for example, to read information from the mobile device. The mobile device transmits mobile device information, according to the read signal from the vehicle-mounted device. The vehicle-mounted device determines whether or not the mobile device relates to this vehicle, based on the mobile device information from the mobile device. When the vehicle-mounted device determines that the mobile device relates to this vehicle, it transmits an instruction signal to the above mentioned controller to unlock the doors of the vehicle. The controller unlocks the doors of the vehicle, according to the instruction signal from the vehicle-mounted device.

In this way, for a vehicle with a passive keyless entry system installed, it is possible to lock or unlock the doors of the vehicle without inserting a vehicle key into a keyhole, by performing communication between the vehicle-mounted device and the mobile device (refer to Japanese Laid-open Patent Publication 2000-198420).

However, with communication between the vehicle-mounted device and the mobile device for the above-mentioned vehicle with the passive keyless entry system installed, there has been a possibility that the vehicle may be stolen when a so-called relay attack is carried out. In this relay attack, in a state where in normal circumstances communication is not possible between the vehicle-mounted device and the mobile device due to the wearer moving outside the communication-feasible range, there is a theft ploy in which, by utilizing a relay unit, communication between the vehicle-mounted device and the mobile device is made possible, a door of the vehicle is unlocked, and the vehicle is stolen.

The relay attack is detailed below, using FIG. 9. FIG. 9 illustrates communication between the vehicle-mounted device 101 and the mobile device 102, utilizing relay units A and B. The vehicle-mounted device 101 is installed, for example, in the door on the driver-seat side and transmits the above described signal A. Within the communication range indicated by a dashed line C, the vehicle-mounted device 101 can transmit and receive signals. When the mobile device 102 receives the signal A from the vehicle-mounted device 101 as described above, it transmits the signal B in response to the signal A. Moreover, within the communication range indicated by a dashed line D, the mobile device 102 can transmit and receive signals.

When the wearer moves outside the communication-feasible range, the signal B from the mobile device 102 in response to the signal A can no longer be transmitted to the vehicle-mounted device 101 as described above, and the controller (not shown) locks the doors according to an instruction signal from the vehicle-mounted device 101.

At this time, it is supposed that intermediaries x and Y, who are attempting to steal the vehicle, are present. The intermediary X holds a relay unit A and enters the communication range C of the vehicle-mounted device 101. Furthermore, the intermediary Y, holding a relay unit B, moves close to the wearer and the relay unit B enters the communication range D of the mobile device 102. Since the relay unit A held by the intermediary X is within the communication range C of the vehicle-mounted device 101, it receives the signal A; the relay unit A detects the signal A, amplifies it and transmits it. Since the relay unit A amplifies the signal A, the signal A can be transmitted over a wider range than the communication range C of the vehicle-mounted device 101. When the signal A, amplified by the relay unit A, is received by the relay unit B, held by the intermediary Y, the relay unit B detects this amplified signal A, attenuates it to, for example, the level the signal A had before being amplified by the relay unit A, and transmits it. At this time, since the relay unit B is within the communication range D of the mobile device 102, the mobile device 102 receives the signal A, attenuated by the relay unit B. The mobile device 102 takes the signal A as though it was transmitted by the vehicle-mounted device 101, and transmits the signal B in response to this signal A. When the relay unit B receives the signal B, the relay unit B detects the signal B, and transmits it after amplification. Since the relay unit B amplifies the signal B, the signal B can be transmitted over a wider range than the communication range D of the mobile device 102. When the relay unit A receives the signal B, amplified by the relay unit B, the relay unit A detects this amplified signal B, and attenuates it to, for example, the level the signal B had before being amplified by the relay unit B, and transmits it. At this time, since the relay unit A is within the communication range C of the vehicle-mounted device 101 as described above, the vehicle-mounted device 101 receives the signal B that was attenuated by the relay unit A. As a result, since the vehicle-mounted device 101 receives the signal B in response to signal A, it determines that the mobile device 102 is within the communication-feasible range. The vehicle-mounted device 101 performs the above described processing to unlock the doors of the vehicle. The intermediary X, for example, gets into the unlocked vehicle, and the vehicle is stolen.

In this way, regarding communication between the vehicle-mounted device 101 and the mobile device 102 with the relay units A and B intervening, since the vehicle-mounted device 101 receives the signal B via the relay units A and B, there was a possibility that it would determine that the mobile device 102 is within the communication-feasible range. As a result, there was a possibility that the vehicle-mounted device 101 would transmit an instruction signal to the controller to unlock the doors of the vehicle and, regardless of the fact that the wearer is not within the communication-feasible range, the controller would unlock the doors.

SUMMARY OF THE INVENTION

Therefore, the present invention has as an object the provision of a position detection system, a position detection method for the position detection system, a position detection communication device, and a communication device, which, even in a state where communication between a plurality of first communication devices (for example, a plurality of vehicle-mounted devices) and a second communication device (for example, a mobile device) is not possible due to the distance between plurality of the first communication devices and the second communication device being at or above a predetermined distance, can detect the position of a relay device (for example, a relay unit) that enables communication between plurality of the first communication devices and the second communication device.

The invention is directed at solving the above described and other problems and includes a position detection system for detecting a relay device, comprising a plurality of first communication devices, each of plurality of the first communication devices including a first transmitter for transmitting a distance-calculation signal for calculating distance to the second communication device, a detector for detecting, by receiving from the second communication device a signal corresponding to the distance-calculation signal, phase difference between the distance-calculation signal when transmitted and the signal corresponding to the distance-calculation signal when received, and a calculator for calculating the distance to the second communication device, based on the phase difference detected by the detector, a second communication device, the second communication device including a second transmitter for transmitting the signal corresponding to the distance-calculation signal transmitted by plurality of the first communication devices, a determining unit for determining whether or not the multiple distances to the second communication device, calculated by plurality of the calculators of plurality of the first communication devices, are below a predetermined distance, and a position detector for detecting the position of the relay device corresponding to the multiple distances on the basis of the determining result when the determining unit has determined that the multiple distances to the second communication device, calculated by plurality of the calculators of plurality of the first communication devices, are at or above the predetermined distance, wherein in a state where communication between plurality of the first communication devices and the second communication device is not possible due to multiple distances between plurality of the first communication devices and the second communication device being at or above a predetermined distance, enables communication between plurality of the first communication devices and the second communication device.

Another aspect of the present invention is a position detection system for detecting a relay device, comprising a first communication device, the first communication device including a first transmitter for transmitting a distance-calculation signal for calculating distance to the second communication device, a plurality of receivers for receiving from the second communication device a signal corresponding to the distance-calculation signal, a detector for detecting, by means of plurality of the receivers receiving from the second communication device the signal corresponding to the distance-calculation signal, a plurality of phase differences between the distance-calculation signal when transmitted and the signal corresponding to the distance-calculation signal when received, and a calculator for calculating the multiple distances to the second communication device, based on plurality of the phase differences detected by the detector, the second communication device comprising a second transmitter for transmitting the signal corresponding to the distance-calculation signal transmitted by the first communication device, the position detection system further comprising a determining unit for determining whether or not the multiple distances to the second communication device, calculated by the calculator, are below a predetermined distance, and a position detector for detecting the position of the relay device corresponding to the multiple distances on the basis of the determining result when the determining unit has determined that the multiple distances to the second communication device, calculated by the calculator, are at or above the predetermined distance, wherein in a state where communication between the first communication device and the second communication device is not possible due to multiple distances between the first communication device and the second communication device being at or above the predetermined distance, enables communication between the first communication device and the second communication device.

A further aspect of the present invention is a position detection method for a position detection system for detecting a relay device, comprising transmitting by means of each of a plurality of first communication devices a distance-calculation signal for calculating distance to a second communication device, transmitting by means of the second communication device a signal corresponding to the distance-calculation signal transmitted by plurality of the first communication devices, detecting by means of each of plurality of the first communication devices, by receiving from the second communication device the signal corresponding to the distance-calculation signal, phase difference between the distance-calculation signal when transmitted and the signal corresponding to the distance-calculation signal when received, calculating by means of each of plurality of the first communication devices the distance to the second communication device, based on the phase difference, determining whether or not the multiple distances to the second communication device, calculated by plurality of the first communication devices, are below a predetermined distance and, when a determination has been made that the multiple distances to the second communication device, calculated by plurality of the first communication devices, are at or above the predetermined distance, detecting the position of the relay device corresponding to the multiple distances, wherein in a state where communication between plurality of the first communication devices and the second communication device is not possible due to multiple distances between plurality of the first communication devices and the second communication device being at or above the predetermined distance, enables communication between plurality of the first communication devices and the second communication device.

Yet further aspect of the present invention is a position detection communication device for detecting a relay device, comprising a plurality of distance-calculation communication devices, each of plurality of the distance-calculation communication device including a transmitter for transmitting a distance-calculation signal for calculating distance to the partner communication device, a detector for detecting, by receiving from the partner communication device a signal corresponding to the distance-calculation signal, phase difference between the distance-calculation signal when transmitted and the signal corresponding to the distance-calculation signal when received, and a calculator for calculating the distance to the partner communication device, based on the phase difference detected by the detector, a determining unit for determining whether or not the multiple distances to the partner communication device, calculated by plurality of the calculators of plurality of the distance-calculation communication devices, are below a predetermined distance, and a position detector for detecting the position of the relay device corresponding to the multiple distances on the basis of the determining result when the determining unit has determined that the multiple distances to the partner communication device, calculated by plurality of the calculators of plurality of the distance-calculation communication devices, are at or above the predetermined distance, wherein in a state where communication with a partner communication device is not possible due to multiple distances to the partner communication device being at or above the predetermined distance, enables communication with the partner communication device.

Another aspect of the present invention is a communication device which can communicate with a partner communication device, the partner communication device having a plurality of distance-calculation communication devices that each transmits a distance-calculation signal to calculate distance; detects, by receiving a signal corresponding to the distance-calculation signal that is returned, phase difference between the distance-calculation signal when transmitted and the signal corresponding to the distance-calculation signal when received; and calculates the distance to the transmission position of the signal corresponding to the distance-calculation signal, based on the phase difference, the partner communication device which in order to detect the position of a relay device that, where reception of the signal corresponding to the distance-calculation signal, from the transmission position, is not possible due to multiple distances, calculated by plurality of the distance-calculation communication devices, being at or above a predetermined distance, enables reception by plurality of the distance-calculation communication devices of the signal corresponding to the distance-calculation signal from the transmission position, determines whether or not the multiple distances calculated by plurality of the distance-calculation communication devices are below the predetermined distance, and detects the position of the relay device corresponding to the multiple distances on the basis of the determining result when the multiple distances calculated by plurality of the distance-calculation communication devices are determined to be at or above the predetermined distance, the communication device comprising a transmitter for transmitting the signal corresponding to the distance-calculation signal transmitted by the partner communication device.

Features and objects of the present invention other than the above will become apparent from the description of this specification and the accompanying drawings.

BRIEF DESCRIPTION OF THE DRAWINGS

For a more complete understanding of the present invention and the advantages thereof, reference is now made to the following description taken in conjunction with the accompanying drawings wherein.

DETAILED DESCRIPTION OF THE INVENTION

According to the description in the specification and accompanying drawings, the following particulars at least are apparent.

<<Implementations>>

==Overall Configuration of Position Detection System, Position Detection Communication Device, and Communication Device==

Figure 1:
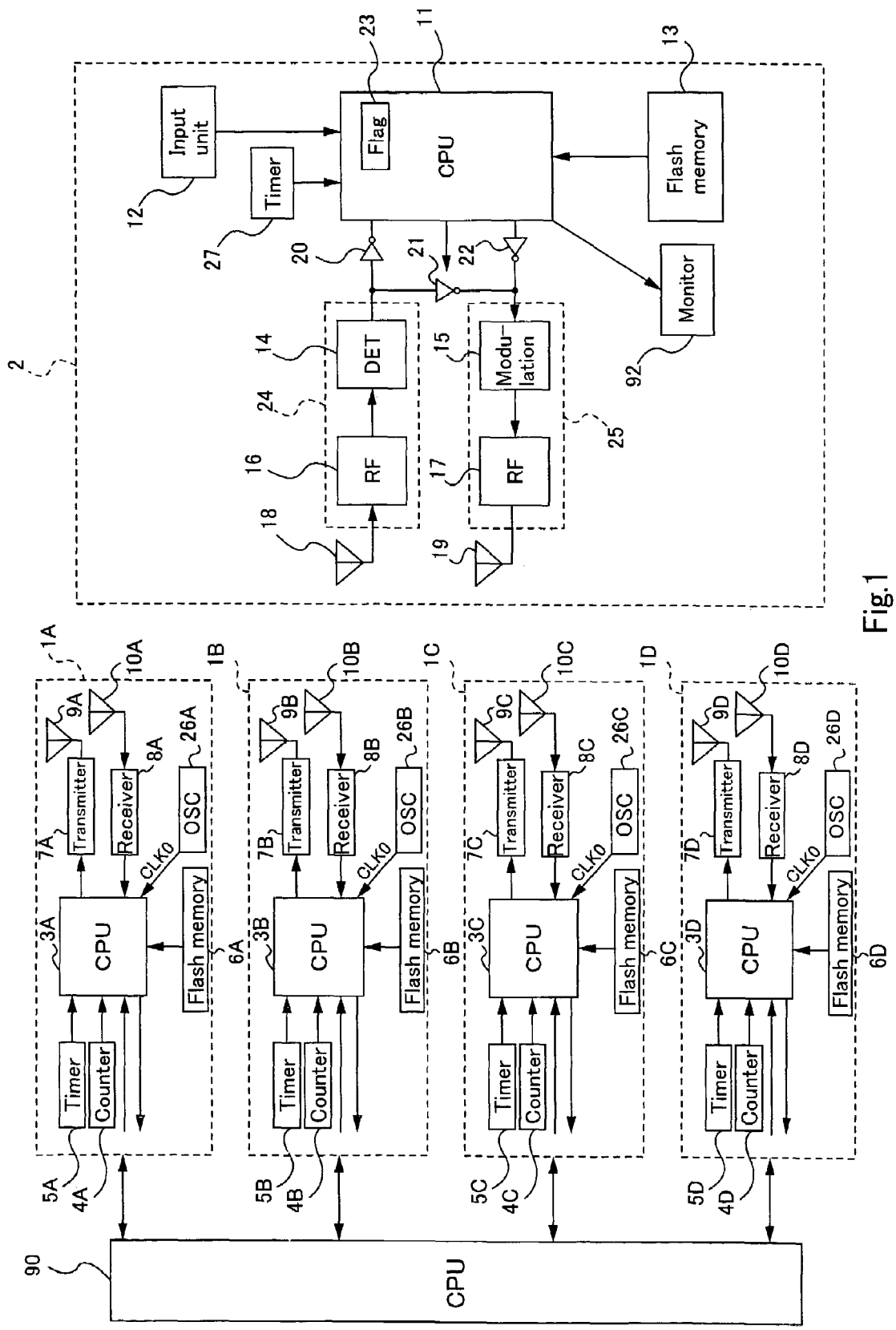
FIG. 1 illustrates an example of an overall configuration of a position detection system, a position detection communication device, and a communication device of the present invention.
Figure 6:
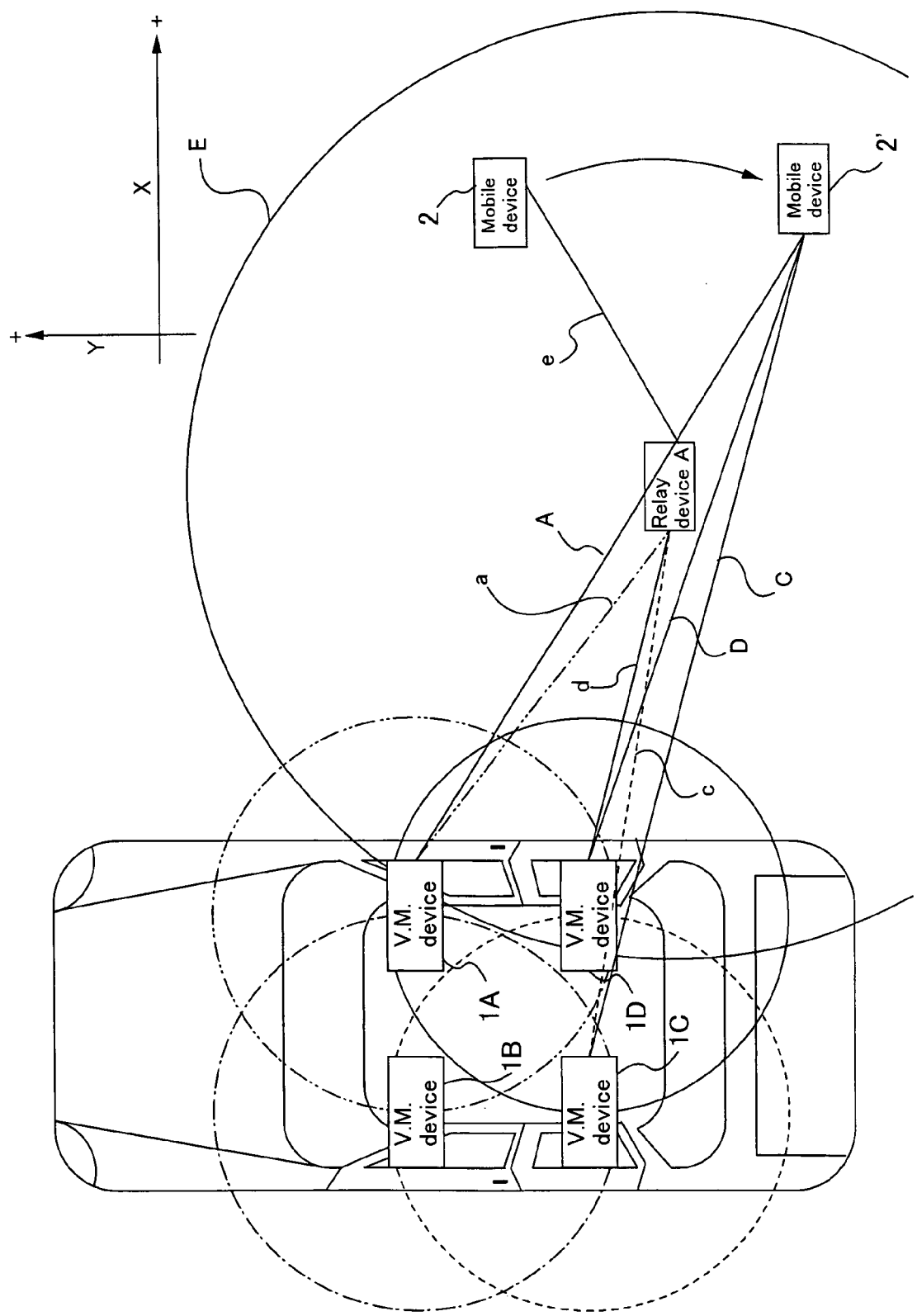
FIG. 6 illustrates detection of the position of a relay device A by means of vehicle-mounted devices 1A, 1B, 1C, and 1D.

A position detection system, a position detection communication device, and a communication device related to the present invention are explained, referring to FIGS. 1 and 6. FIG. 1 is a functional block diagram illustrating one example of an overall configuration of the position detection system, the position detection communication device, and the communication device of the present invention. In this implementation, the position detection system, the position detection communication device, and the communication device are explained using as an example a passive keyless entry system in which the doors of a vehicle can be locked or unlocked without the operation of a key. The position detection system is configured with vehicle-mounted devices 1A, 1B, 1C, and 1D (a plurality of first communication devices), a mobile device 2 (a second communication device), and a CPU (Central Processing Unit) 90 (a determining unit and a position detector). The position detection communication device is configured with the vehicle-mounted devices 1A, 1B, 1C, and 1D (distance-calculation communication devices) and the CPU 90 (the determining unit and the position detector), and a partner communication device is used in the mobile device 2. Furthermore, the communication device is used in the mobile device 2, and a partner communication device is configured with the vehicle-mounted devices 1A, 1B, 1C, and 1D (the distance-calculation communication devices) and the CPU 90. FIG. 6 illustrates detection of the position of a relay unit A by means of the vehicle-mounted devices 1A, 1B, 1C, and 1D. Furthermore, let the +Y direction be in the forward direction of the vehicle in FIG. 6, then, for example, the vehicle-mounted device 1A is installed on the forward right-hand side, the vehicle-mounted device 1B is installed on the forward left-hand side, the vehicle-mounted device 1C is installed on the rear left-hand side, and the vehicle-mounted device 1D is installed on the rear right-hand side. Additionally, the CPU 90 is installed inside the vehicle in which the vehicle-mounted devices 1A, 1B, 1C, and 1D are installed. The mobile device 2 is installed in the vehicle key. Furthermore, in this implementation, four vehicle-mounted devices are used; however, this does not imply a limitation. For example, more vehicle-mounted devices may be installed so that the position of the relay unit A is reliably detected.

In this implementation, a low frequency carrier wave (for example, 125 kHz) is used for communicating a signal from the vehicle-mounted devices 1A, 1B, 1C and 1D to the mobile device 2. Additionally, a high frequency carrier wave (for example, 312 MHz) is used for communicating a signal from the mobile device 2 to the vehicle-mounted devices 1A, 1B, 1C and 1D. That is, in communicating from the vehicle-mounted devices 1A, 1B, 1C and 1D to the mobile device 2, communication speed slows down, since the communication is carried out with the low frequency carrier wave. Conversely, in communicating from the mobile device 2 to the vehicle-mounted devices 1A, 1B, 1C and 1D, the communication speed increases since the communication is carried out with the high frequency carrier wave. The reason for using the low frequency with which the communication speed is slow is, as described below, in order to intentionally produce a signal phase difference (or time difference) between the time the signal is transmitted from the vehicle-mounted devices 1A, 1B, 1C and 1D, and the time the signal is returned via the mobile device 2. Moreover, by using the high frequency, with which the communication speed is fast, for communication from the mobile device 2 to the vehicle-mounted devices 1A, 1B, 1C and 1D, the phase difference during that time is of a level that can be ignored, compared to the phase difference that occurs with communication from the vehicle-mounted devices 1A, 1B, 1C and 1D to the mobile device 2. That is, by using only the phase difference that is intentionally produced in the communication from the vehicle-mounted devices 1A, 1B, 1C and 1D to the mobile device 2, it is possible to calculate the distance between the vehicle-mounted devices 1A, 1B, 1C and 1D, and the mobile device 2. Hence, the low frequency is intentionally used for the communication from the vehicle-mounted devices 1A, 1B, 1C and 1D to the mobile device 2, and the high frequency is used for the communication from the mobile device 2 to the vehicle-mounted devices 1A, 1B, 1C and 1D.

Furthermore, the above described communication from the vehicle-mounted devices 1A, 1B, 1C and 1D to the mobile device 2 is performed by means of a signal that has been ASK (Amplitude Shift Keying) modulated. This is because circuits for transmitters 7A, 7B, 7C and 7D (first transmitters and first modulators) for transmitting signals from the vehicle-mounted devices 1A, 1B, 1C and 1D to the mobile device 2, and a circuit for a demodulator 24 (a second demodulator) for receiving signals from the vehicle-mounted devices 1A, 1B, 1C and 1D, are easy to configure, and even with some interference, transmission from the vehicle-mounted devices 1A, 1B, 1C and 1D, to the mobile device 2 is possible. Furthermore, communication from the mobile device 2 to the vehicle-mounted devices 1A, 1B, 1C and 1D is performed by means of a signal that has been FSK (Frequency Shift Keying) modulated. This is because the FSK-modulated signal is not easily affected by noise, and it is possible to reliably transmit information from the mobile device 2 to the vehicle-mounted devices 1A, 1B, 1C and 1D, without loss. Furthermore, in this implementation, performing communication from the vehicle-mounted devices 1A, 1B, 1C and 1D to the mobile device 2 by means of the ASK-modulated signal, and performing communication from the mobile device 2 to the vehicle-mounted devices 1A, 1B, 1C and 1D by means of the FSK-modulated signal does not imply any limitation. For example, it is also possible to perform the communication from the vehicle-mounted devices 1A, 1B, 1C and 1D to the mobile device 2 and the communication from the mobile device 2 to the vehicle-mounted devices 1A, 1B, 1C and 1D in spread spectrum, where signal confidentiality can be improved, with highly enhanced abilities to exclude jamming waves and interference waves.

The CPU 90 performs integrated control of the vehicle-mounted devices 1A, 1B, 1C and 1D.

The vehicle-mounted device 1A has a CPU 3A (a detector, a calculator and a generator), a counter 4A, a timer 5A, a flash memory 6A (a memory unit), a transmitter 7A, a receiver 8A (a first demodulator), a transmitting antenna 9A, a receiving antenna 10A, and an OSC 26A (an oscillating circuit).

The transmitter 7A performs ASK modulation on the signal from the CPU 3A, with a carrier wave of 125 kHz frequency.

The transmitting antenna 9A transmits the signal ASK-modulated by the transmitter 7A.

The receiving antenna 10A receives the FSK-modulated signal from the mobile device 2.

The receiver 8A demodulates the FSK-modulated signals from the mobile device 2 received by the receiving antenna 10A.

The CPU 3A is arranged to provide integrated control of the vehicle-mounted device 1A. Program code with which the CPU 3A performs processing, as described below, is stored in advance in the flash memory 6A. Furthermore, code signals and personal data with which data from the mobile device 2, demodulated by the receiver 8A, is verified when the CPU 3A performs processing in order to unlock the doors of the vehicle, are stored in advance in the flash memory 6A. In addition, an encryption-decryption program for decrypting encrypted personal data (encrypted personal data stored in the flash memory 13 of the mobile device 2, that has to be verified, by the CPU 3A, with the above mentioned personal data) from the mobile device 2, demodulated by the receiver 8A, is stored in advance in the flash memory 6A. The flash memory 6A is formed of a nonvolatile storage component that can repeatedly be read from and written to, by electrically erasing data.

The timer 5A measures time, according to instructions from the CPU 3A.

The OSC 26A transmits a prescribed clock frequency (CLKO) to the CPU 3A.

According to an instruction from the CPU 90, the counter 4A counts, for example, the rising edges of the clock frequency from the OSC 26A, from the rising edge of a signal (hereinafter referred to as a distance-calculation signal), for calculating the distance from the vehicle-mounted device 1A to the mobile device 2, transmitted by the CPU 3A to the transmitter 7A. The counter 4A counts the rising edges of the clock frequency from the OSC 26A, until the rising edge of the distance-calculation signal demodulated by the receiver 8A. Furthermore, the count value of the counter 4A is reset according to an instruction from the CPU 3A.

The CPU 3A, according to an instruction signal from the CPU 90, transmits the above mentioned distance-calculation signal to the transmitter 7A, as well as resetting the counter 4A and starting the count. Furthermore, the CPU 3A resets the timer 5A and makes it start timing. The CPU 3A receives the distance-calculation signal from the mobile device 2 demodulated by the receiver 8A, and reads the count value of the counter 4A. The CPU 3A calculates the distance from the vehicle-mounted device 1A to the mobile device 2 based on the count value. That is, the count value showing the phase difference between the two signals—from the time the distance-calculation signal is transmitted to the transmitter 7a, to the time the distance-calculation signal is returned via the mobile device 2—is obtained, and the CPU 3A can calculate the distance from the vehicle-mounted device 1A to the mobile device 2. For example, where the clock frequency from the OSC 26A is 15.75 kHz, and the count value of the counter 4A, when the distance-calculation signal is returned via the mobile device 2, is 250, the phase difference is about 15.87 (msec). The fact that when the phase difference is about 15.87 (msec), the distance from the vehicle-mounted device 1A to the mobile device 2 is about 1 (meter), can be obtained, for example, by experiment. The distance data corresponding to the count values obtained by this experiment is stored in advance as tabular data in, for example, the flash memory 6A. The CPU 3A transmits to the CPU 90 calculated information concerning the distance from the vehicle-mounted device 1A to the mobile device 2. According to an instruction from the CPU 90, the CPU 3A transmits a signal (hereinafter referred to as an identifying signal) to the transmitter 7A to make an inverter 21 (returning unit) of the mobile device 2 non-operational. Furthermore, the CPU 3A transmits a signal (hereinafter referred to as a code-reading signal) to the transmitter 7A to read, from the mobile device 2, a code signal corresponding to a code signal stored in the flash memory 6A. The CPU 3A transmits the code signal from the mobile device 2 demodulated by the receiver 8A. If the CPU 3A determines that the code signal from the mobile device 2 and the code signal from the flash memory 6A have a prescribed relationship, it transmits, to the transmitter 7A, a signal (hereinafter referred to as an encrypted personal data reading signal) to read the above described encrypted personal data. The encrypted personal data from the mobile device 2 demodulated by the receiver 8A is transmitted to the CPU 3A. The CPU 3A decrypts the encrypted personal data, according to the encryption-decryption program stored in the flash memory 6A. If the CPU 3A determines that the decrypted personal data and the personal data from the flash memory 6A match, it transmits, to the transmitter 7A, a signal (hereinafter referred to as an input confirmation signal) to confirm whether the doors of the vehicle are to be unlocked (for example, either all doors of the vehicle or the driver-seat door). An input signal corresponding to the input confirmation signal from the mobile device 2, demodulated by the receiver 8A is transmitted to the CPU 3A. The CPU 3A transmits, to the CPU 90, an instruction signal to unlock the vehicle door or doors, in response to the input signal from the mobile device 2, demodulated by the receiver 8A. Furthermore, the CPU 3A transmits, to the transmitter 7A, a signal (hereinafter referred to as an intra-intra-area confirmation signal A) to determine whether or not the mobile device 2 is within a communication-feasible range, according to an instruction from the CPU 90. At this time, the CPU 3A resets the timer 5A and makes it start timing. The CPU 3A determines whether or not a signal (hereinafter referred to as an intra-intra-area confirmation signal B) corresponding to the intra-intra-area confirmation signal A is transmitted by the mobile device 2 within a predetermined time (t1 in FIG. 4). If the CPU 3A determines that the intra-intra-area confirmation signal B has not been transmitted by the mobile device 2 within the predetermined time, it transmits, to the CPU 90, an instruction signal to lock the vehicle doors. Furthermore, these functions of the CPU 3A are realized by the CPU 3A executing the program using the result of decoding the program code read from the flash memory 6A. The CPU 3A has an address counter (not illustrated) that specifies the address of the flash memory 6A, a program logic array (not illustrated) that decodes the program code read from the flash memory 6A, an arithmetic-logic unit (not illustrated) that performs logical operations, and a register (not illustrated) for temporarily storing operation data.

The configuration of the vehicle-mounted devices 1B, 1C and 1D is similar to that of the above described vehicle-mounted device 1A. Furthermore, the vehicle-mounted devices 1A, 1B, 1C and 1D may perform the above described processing according to instructions from the CPU 90 simultaneously, or may perform the above described processing sequentially.

According to an instruction signal from the controller (not illustrated) installed inside the vehicle, the CPU 90 transmits, to the vehicle-mounted devices 1A, 1B, 1C and 1D, an instruction signal so that the CPUs 3A, 3B, 3C and 3D transmit the intra-intra-area confirmation signal A. When the CPU 90 receives an instruction signal from, for example, all the vehicle-mounted devices 1A, 1B, 1C and 1D to lock the vehicle doors, it transmits, to the controller, an instruction signal to lock the vehicle doors. The CPU 90 transmits, to the vehicle-mounted devices 1A, 1B, 1C and 1D, an instruction signal to make the CPUs 3A, 3B, 3C and 3D calculate the distances from the vehicle-mounted devices 1A, 1B, 1C and 1D to the mobile device 2. Information concerning the distances from the vehicle-mounted devices 1A, 1B, 1C and 1D to the mobile device 2 calculated by the CPUs 3A, 3B, 3C and 3D is transmitted to the CPU 90. Based on the above mentioned distance information, the CPU 90 determines whether or not the distances from the vehicle-mounted devices 1A, 1B, 1C and 1D to the mobile device 2 are within a predetermined distance (for example, 1 meter). If the CPU 90 determines that the distances from the vehicle-mounted devices 1A, 1B, 1C and 1D to the mobile device 2 are at or above the predetermined distance, it detects the position of the mobile device 2' corresponding to the distance information calculated by the CPUs 3A, 3B, 3C and 3D (refer to FIG. 6). Furthermore, the fact that the CPU 90 at this time determines that the distances from the vehicle-mounted devices 1A, 1B, 1C and 1D to the mobile device 2 are at or above the predetermined distance, means that a relay unit A (a relay device) lies between the vehicle-mounted devices 1A, 1B, 1C and 1D and the mobile device 2. This is because when the distances between the vehicle-mounted devices 1A, 1B, 1C and 1D and the mobile device 2 are below the predetermined distance, it means that the vehicle-mounted devices 1A, 1B, 1C and 1D and the mobile device 2 are inside the communication-feasible range. If the mobile device 2 is outside the communication-feasible range, that is, if the distances between the vehicle-mounted devices 1A, 1B, 1C and 1D and the mobile device 2 are at or above the predetermined distance, it means that under normal circumstances communication is not possible between the vehicle-mounted devices 1A, 1B, 1C and 1D and the mobile device 2. Thus, where a distance between the vehicle-mounted devices 1A, 1B, 1C and 1D and the mobile device 2 is at or above the predetermined distance, under normal circumstances the distance is not valid as a distance calculated by the CPU 3A, 3B, 3C or 3D. That is, it can be determined that communication is taking place between the vehicle-mounted devices 1A, 1B, 1C and 1D and the mobile device 2 via a relay unit A. The CPU 90, in order to detect the position of the relay unit A, detects the position of the mobile device 2' corresponding to the distance information calculated by the CPUs 3A, 3B, 3C and 3D as described above. At this time, the position of the mobile device 2' by the CPU 90 can be detected, for example, as a meeting point of the distances read from the distance information calculated by the CPUs 3A, 3B, 3C and 3D. The CPU 90 calculates the range (hereinafter referred to as a detection range) given by the detected position of the mobile device 2' and those of the vehicle-mounted devices 1A, 1B, 1C and 1D. The CPU 90 transmits a signal (hereinafter referred to as a detection signal) indicating the calculated detection range to the vehicle-mounted devices 1A, 1B, 1C and 1D. In this implementation, transmission of only the detection signal, indicating the calculated range, to the vehicle-mounted devices 1A, 1B, 1C and 1D, does not imply any limitation. For example, where a Global Positioning System (GPS) is installed in the vehicle, an arrangement may be made to transmit a signal indicating the detection range and also map information for the detection range. By so doing, it is possible to give more accurate position information of the relay unit A to the holder (hereinafter referred to as the wearer) of the mobile device 2 via the vehicle-mounted devices 1A, 1B, 1C and 1D. Furthermore, if the CPU 90 determines that the distances from the vehicle-mounted devices 1A, 1B, 1C and 1D to the mobile device 2 are below the predetermined distance, it transmits an instruction signal so that the CPUs 3A, 3B, 3C and 3D transmit the identifying signal. When the CPU 90 receives the instruction signal from, for example, all the vehicle-mounted devices 1A, 1B, 1C and 1D to unlock the vehicle doors, it transmits, to the controller, an instruction signal to unlock the vehicle doors. These functions of the CPU 90 are realized by the CPU 90 executing the program using the result of decoding the program code read from memory (not illustrated). The CPU 90 has an address counter (not illustrated) that specifies the address of the memory, a program logic array (not illustrated) that decodes the program code read from the memory, an arithmetic-logic unit (not illustrated) that performs logical operations, and a register (not illustrated) for temporarily storing operation data.

The mobile device 2 has a CPU 11, an input unit 12, a flash memory 13, a demodulator 24, a modulator 25 (a second transmitter and a second modulator), a receiving antenna 18, a transmitting antenna 19, inverters 20, 21 and 22, a flag 23, a timer 27 and a monitor 92.

The receiving antenna 18 receives ASK-modulated signals from the vehicle-mounted devices 1A, 1B, 1C and 1D.

The demodulator 24 is configured, for example, from a RF 16 (radio frequency) and a DET 14 (detector). The demodulator 24 demodulates the ASK-modulated signal from the receiving antenna 18.

The modulator 25 is configured from, for example, a RF 17 and a modulator 15. The modulator 25 performs FSK modulation on signals from the CPU 11 with carrier waves of 312 MHz frequency. Furthermore, where the inverter 21 is put into an operational state by an instruction from the CPU 11, the modulator 25 performs FSK modulation on signals from the demodulator 24 with carrier waves of 312 MHz.

The transmitting antenna 19 transmits the signals FSK-modulated by the modulator 25.

The CPU 11 is configured to provide integrated control of the mobile device 2. Program code that the CPU 11 uses to perform processing, described below, is stored in advance in the flash memory 13. Furthermore, code signals to be transmitted to the vehicle-mounted devices 1A, 1B, 1C and 1D, in response to code-reading signals from the vehicle-mounted devices 1A, 1B, 1C and 1D, are stored in the flash memory 13. In addition, encrypted personal data to be transmitted to the vehicle-mounted devices 1A, 1B, 1C and 1D, in response to an encrypted personal data reading signal from the vehicle-mounted devices 1A, 1B, 1C and 1D, is stored in the flash memory 13. The flash memory 13 is formed of a nonvolatile storage component that can repeatedly be read from and written to, by electrically erasing data.

The timer 27 measures time, based on instructions from the CPU 11.

Instruction signals, for example, in response to instruction input by the wearer, are inputted to the input unit 12. In cases, for example, where the wearer wishes to unlock the door on the driver-seat side, the wearer gives instruction input to unlock the door on the driver-seat side, and an instruction signal in response to the instruction input is inputted to the input unit 12. When this instruction signal to unlock the door on the driver-seat side is inputted, the input unit 12 stores, for example, one logic value "1" in the flag 23. In contrast, where, for example, the wearer wishes to unlock all doors of the vehicle, the wearer gives instruction input to unlock all doors of the vehicle, and an instruction signal according to the instruction input is inputted to the input unit 12. When this instruction signal to unlock all doors is inputted, the input unit 12 stores, for example, the other logic value "0" in the flag 23. Furthermore, in this implementation, a switch (not illustrated), for example, can be provided in the key, and when the wearer wishes to unlock the door on the driver-seat side, he switches the switch to one side, and when he wishes to unlock all the doors of the vehicle, he switches the switch to the other side. Hereinafter, it is supposed that by switching the switch to one side to input, to the input unit 12, the instruction signal to unlock the door on the driver-seat side, the input unit 12 stores "1" in the flag 23. Furthermore, it is supposed that by switching the switch to the other side to input, to the input unit 12, the instruction signal to unlock all doors, the input unit 12 stores "0" in the flag 23.

The intra-intra-area confirmation signal A from the vehicle-mounted devices 1A, 1B, 1C and 1D, demodulated by the demodulator 24, is transmitted to the CPU 11, which transmits the intra-area confirmation signal B to the modulator 25. At this time, the CPU 11 resets the timer 27 and makes it start timing. The CPU 11 determines whether or not the intra-area confirmation signal A is transmitted again from the vehicle-mounted device 1A within a predetermined time (t2 in FIG. 4). If the CPU 11 determines that the intra-area confirmation signal A is not transmitted within the predetermined time, it puts the inverter 21 into an operational state. As a result, without any processing being performed on the signal from the vehicle-mounted devices 1A, 1B, 1C and 1D, that was demodulated by the demodulator 24, the signal can be FSK-modulated as it is, by the modulator 25, and transmitted by the transmitting antenna 19. The above mentioned detection signal, transmitted via the vehicle-mounted devices 1A, 1B, 1C and 1D, from the CPU 90, demodulated by the demodulator 24, is transmitted to the CPU 11. In response to the detection signal, the CPU 11 transmits to the monitor 92 a display signal for displaying the detection range on the monitor 92. When the identifying signal from the vehicle-mounted devices 1A, 1B, 1C and 1D, demodulated by the demodulator 24, is transmitted, and the CPU 11 determines that the identifying signal has been transmitted, it puts the inverter 21 into a non-operational state. When a code-reading signal from the vehicle-mounted devices 1A, 1B, 1C and 1D, demodulated by the demodulator 24, is transmitted, and the CPU 11 determines that the code-reading signal has been transmitted, it reads the code-signal from the flash memory 13 and transmits it to the modulator 25. When an encrypted personal data reading signal from the vehicle-mounted devices 1A, 1B, 1C and 1D, demodulated by the demodulator 24, is transmitted, and the CPU 11 determines that the encrypted personal data reading signal has been transmitted, it reads the encrypted personal data from the flash memory 13 and transmits it to the modulator 25. An input confirmation signal from the vehicle-mounted devices 1A, 1B, 1C and 1D, demodulated by the demodulator 24, is transmitted to the CPU 11. In response to the input confirmation signal, the CPU 11 transmits, as input information, the "1" or "0" information stored in the flag 23 at this time, to the modulator 25. Furthermore, these functions of the CPU 11 are realized by the CPU 11 executing the program using the result of decoding the program code read from the flash memory 13. The CPU 11 has an address counter (not illustrated) that specifies the address of the flash memory 13, a program logic array (not illustrated) that decodes the program data read from the flash memory 13, an arithmetic-logic unit (not illustrated) that performs logical operations, and a register (not illustrated) for temporarily storing operation data.

The monitor 92 displays the detection range, based on the display signal from the CPU 11.

==Operations of Position Detection System, Position Detection Communication Device, and Communication Device==

Figure 2:
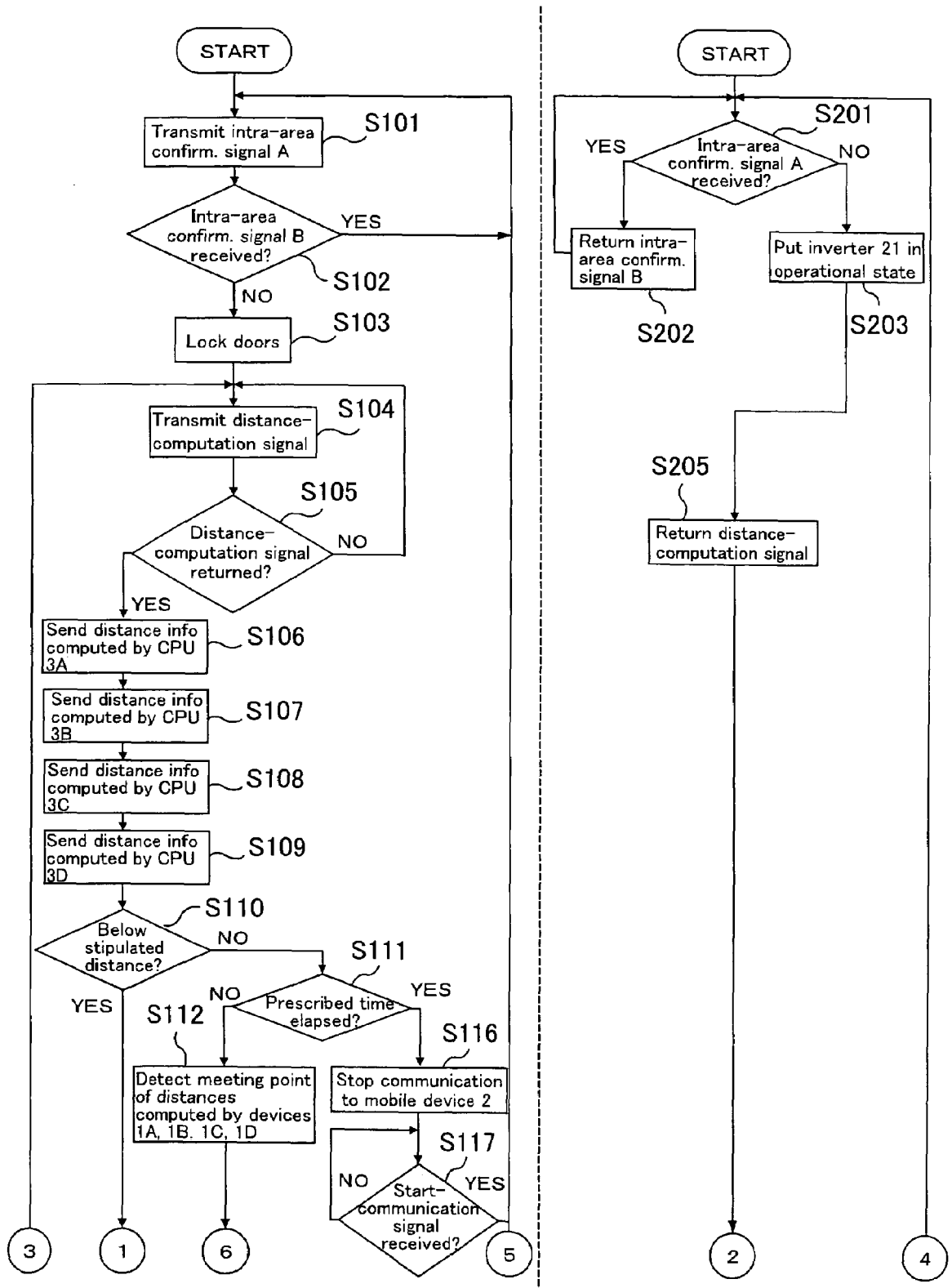
FIG. 2 is a flow chart illustrating an example of operation of the position detection system, the position detection communication device and a partner communication device, and the communication device and a partner communication device, related to the present invention.
Figure 3:
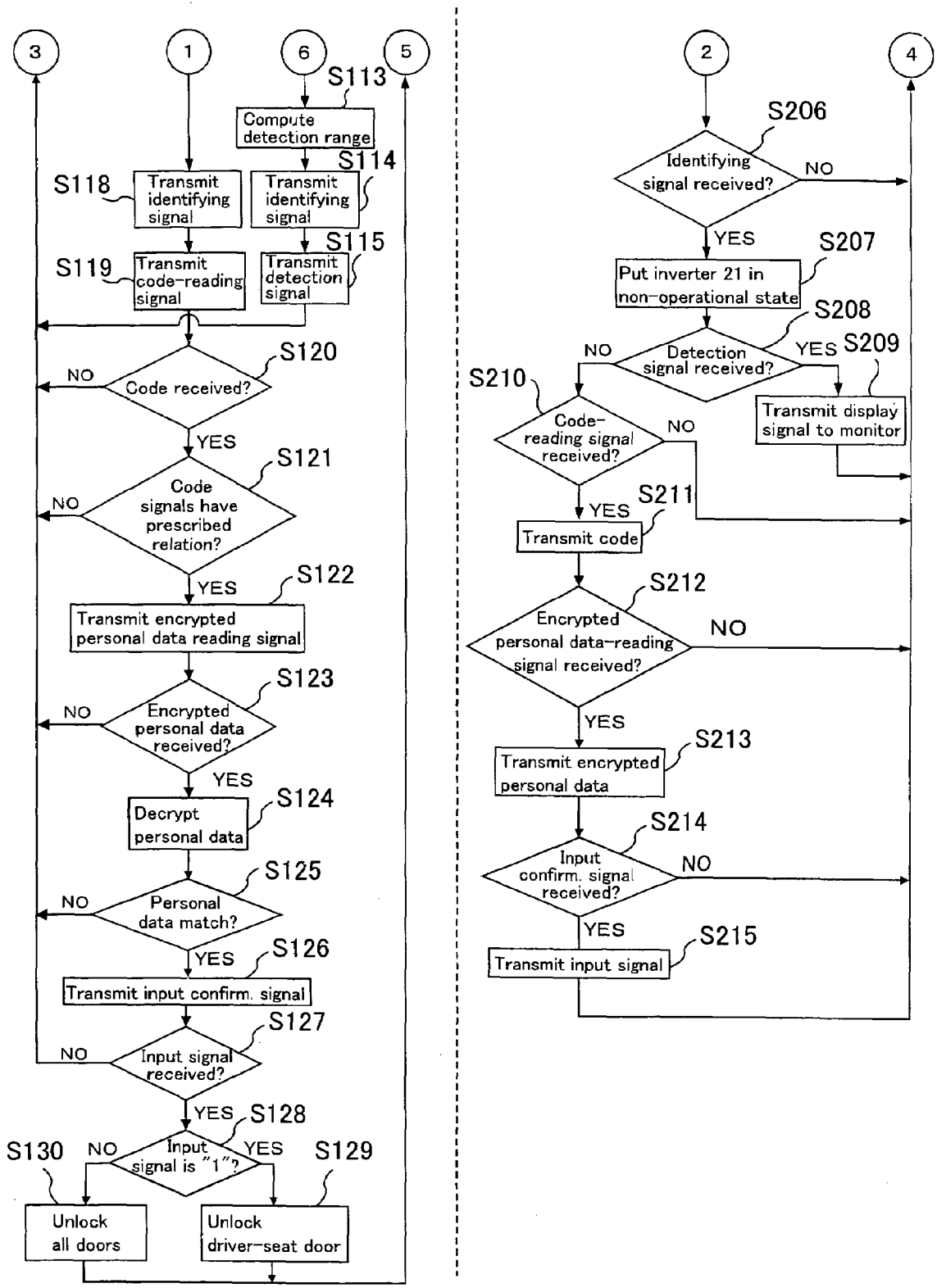
FIG. 3 is a flow chart illustrating an example of operation of the position detection system, the position detection communication device and the partner communication device, and the communication device and the partner communication device, related to the present invention.
Figure 4:
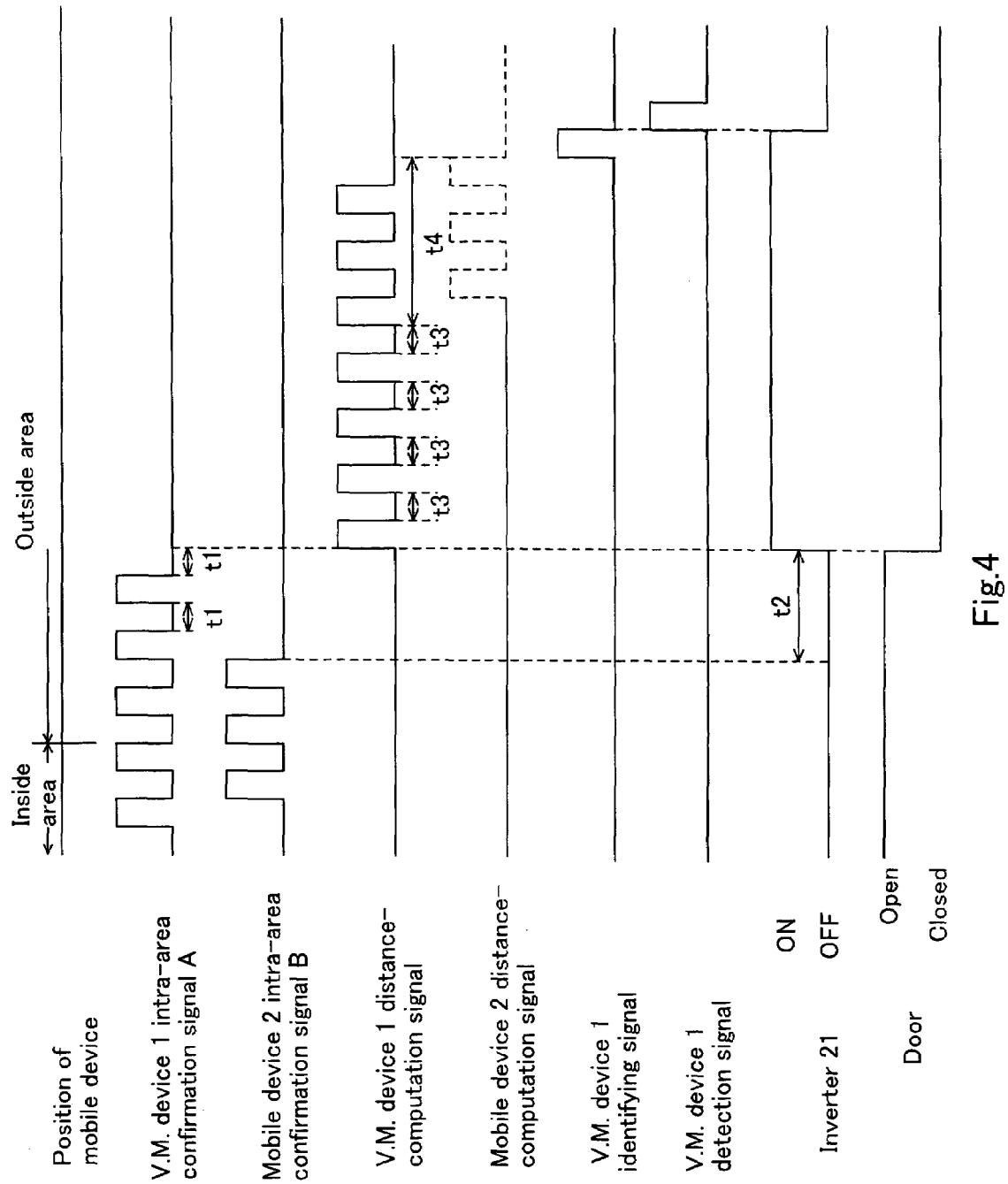
FIG. 4 is a timing chart illustrating an example of the operation of the position detection system, the position detection communication device and the partner communication device, and the communication device and the partner communication device, related to the present invention.
Figure 5:
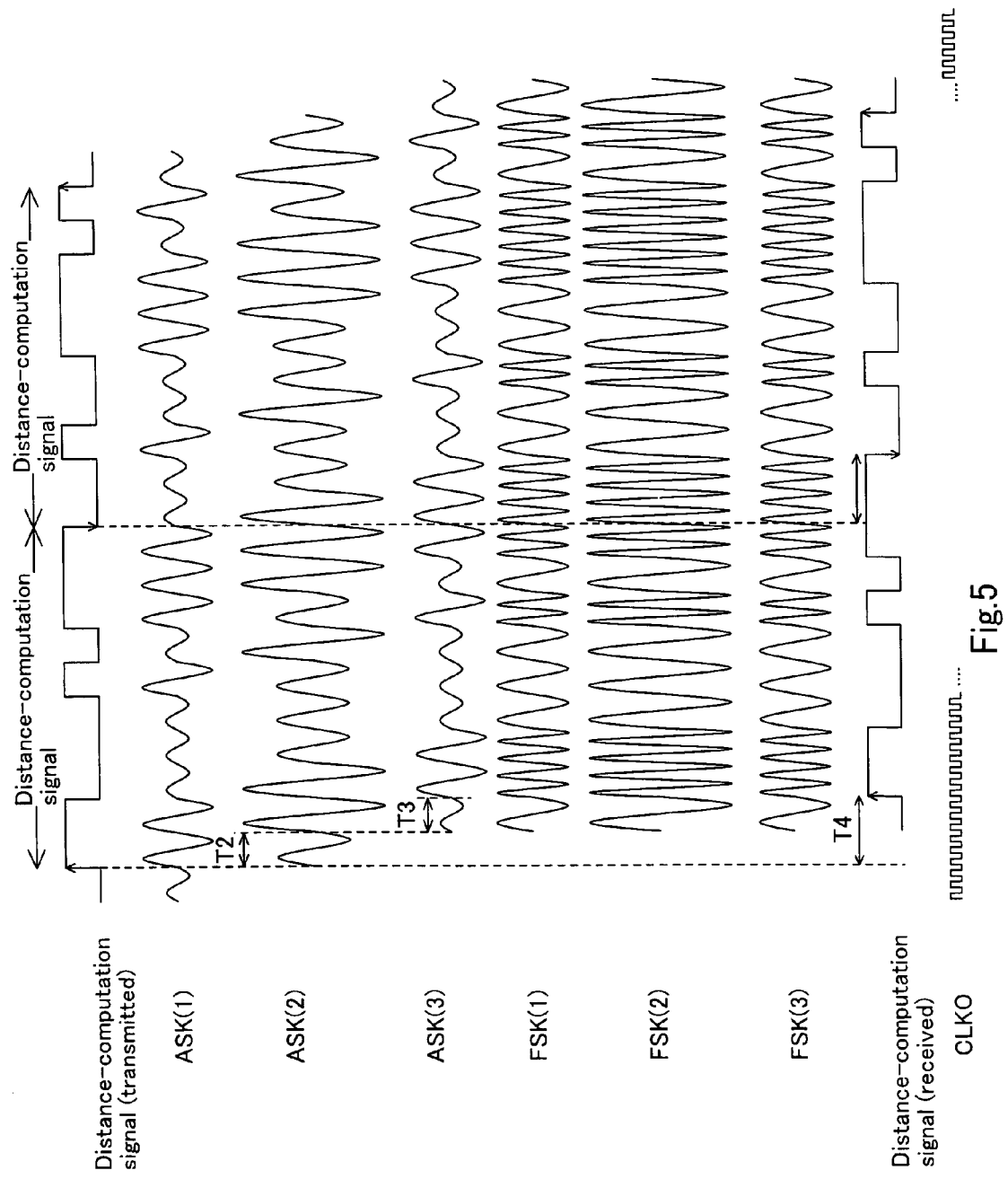
FIG. 5 illustrates variations in a distance-calculation signal.

Operations of the position detection system, the position detection communication device, and the communication device related to the invention are explained, referring to FIGS. 1 through 6. FIG. 2 and FIG. 3 are flow charts illustrating an example of the operations of the position detection system, the position detection communication device and a partner communication device, and the communication device and a partner communication device, related to the invention. FIG. 4 is a timing chart illustrating an example of the operations of the position detection system, the position detection communication device and the partner communication device, and the communication device and the partner communication device, related to the invention. FIG. 5 illustrates variations in the distance-calculation signal. Furthermore, in FIG. 4, signals noted in the left-hand column are transmitted when being at a high level. In actuality, signals to be transmitted from the vehicle-mounted devices 1A, 1B, 1C and 1D to the mobile device 2 are ASK-modulated by the transmitters 7A, 7B, 7C and 7D, and signals to be transmitted from the mobile device 2 to the vehicle-mounted devices 1A, 1B, 1C and 1D are FSK-modulated by the FSK-modulator 25. In addition, a high-level single emission of the distance-calculation signal of the vehicle-mounted device 1A (left-hand column of FIG. 4), for convenience, represents a wave form of the distance-calculation signal (transmitted) (left-hand column of FIG. 5).

Furthermore, the present implementation describes a scene where the wearer has stopped the vehicle engine, exited the vehicle while carrying the mobile device 2, and closed the door. In addition, the inverter 21 of the mobile device 2 is in a non-operational state.

The operation of vehicle-mounted device 1A is explained below; however, the operation of vehicle-mounted devices 1B, 1C and 1D is similar.

The controller (not illustrated) separately installed inside the vehicle receives a signal on the basis that the doors of the vehicle are closed. In response to this signal, the controller transmits a signal to the CPU 90 in order to start the passive keyless entry system. When the CPU 90 receives the signal to start the passive keyless entry system, it transmits an instruction signal so that the CPU 3A transmits an intra-area confirmation signal A. According to the instruction signal from the CPU 90, the CPU 3A transmits the intra-area confirmation signal A to the transmitter 7A (S101). At this time, the CPU 3A resets the timer 5A. The reset timer 5A starts time measurement. The CPU 3A determines whether or not the intra-area confirmation signal B from the mobile device 2, demodulated by the receiver 8A, has been received within the predetermined time (t1) (S102). The transmitter 7A performs ASK modulation on the intra-area confirmation signal A with carrier waves of 125 kHz frequency. The intra-area confirmation signal A, ASK-modulated by the transmitter 7A, is transmitted via the transmitting antenna 9A (vehicle-mounted device 1A intra-area confirmation signal A in FIG. 4).

When the receiving antenna 18 of the mobile device 2 receives the ASK-modulated intra-area confirmation signal A, the demodulator 24 demodulates the ASK-modulated intra-area confirmation signal A. When the CPU 11 determines that the intra-area confirmation signal A, demodulated by the demodulator 24, has been received (S201, YES), it transmits the intra-area confirmation signal B to the modulator 25 (S202). At this time, the CPU 11 resets the timer 27. The reset timer 27 starts time measurement. The CPU 11 determines whether or not the intra-area confirmation signal A from the vehicle-mounted device 1A, demodulated by the demodulator 24, has been received again within a predetermined time (t2) (S201). The modulator 25 performs FSK modulation on the intra-area confirmation signal B from the CPU 11 with carrier waves of 312 MHz frequency. The intra-area confirmation signal B, FSK-modulated by the modulator 25, is transmitted via the transmitting antenna 19 (mobile device 2 intra-area confirmation signal B in FIG. 4).

When the receiving antenna 10A of the vehicle-mounted device 1A receives the FSK-modulated intra-area confirmation signal B, the receiver 8A demodulates the FSK-modulated intra-area confirmation signal B. When the CPU 3A determines that the intra-area confirmation signal B from the mobile device 2, demodulated by the receiver 8A, has been received (S102, YES), it again transmits the intra-area confirmation signal A to the transmitter 7A (S101).

In this way, if the wearer is within a communication-feasible range where the intra-area confirmation signal A from the vehicle-mounted device 1A can be received by the mobile device 2, it is possible for the vehicle-mounted device 1A to receive the intra-area confirmation signal B from the mobile device 2 (inside area in FIG. 4). As a result, it is possible for the vehicle-mounted device 1A to determine whether or not the wearer is in the vicinity (that is, within a communication-feasible range).

Next, a case where the wearer moves outside the above described communication-feasible range is explained (outside area in FIG. 4).

If the wearer moves outside the communication-feasible range, the mobile device 2 can no longer receive the intra-area confirmation signal A from the vehicle-mounted device 1A, and as a result, the intra-area confirmation signal B from the mobile device 2 comes not to be transmitted to the vehicle-mounted device 1A. When the CPU 3A determines that the intra-area confirmation signal B from the mobile device 2 has not been received when a predetermined time (t1) elapses after the intra-area confirmation signal A was transmitted (S102, NO), it transmits, to the CPU 90, an instruction signal to lock the doors of the vehicle. In this case, the CPU 3A may be configured so that the intra-area confirmation signal A is transmitted to the transmitter 7A several times (for example, twice) (refer to FIG. 4). In cases where the CPU 3A determines that the intra-area confirmation signal B from the mobile device 2 has not been received in response to the intra-area confirmation signal A for all of the several transmission times, an instruction signal to lock the doors of the vehicle may be transmitted to the CPU 90. If this is done, the CPU 3A can determine more reliably that the wearer is not within the communication-feasible range. In addition, in cases where the wearer moves outside the communication-feasible range but immediately returns to within the communication-feasible range, it is possible to proceed without performing processing to lock the doors. As a result, time for processing the unlocking of the doors is no longer necessary, and it is possible to eliminate delays due to the time required for this processing to unlock the doors. When the CPU 90 receives an instruction signal from, for example, all the vehicle-mounted devices 1A, 1B, 1C and 1D to lock the doors of the vehicle, it transmits, to the controller (not illustrated), an instruction signal to lock the doors of the vehicle (S103). The controller, which receives the instruction signal from the CPU 90, locks the doors of the vehicle according to the instruction signal (FIG. 4, close doors). In addition, when the instruction signal to lock the doors of the vehicle, as described above, is transmitted to the CPU 90, the CPU 3A transmits a distance-calculation signal (FIG. 5, distance-calculation signal (transmitted)) to the transmitter 7A (S104). At this time, the CPU 3A resets the counter 4A, and makes the counter 4A start a count from the rising edge of the distance-calculation signal. In addition, the CPU 3A resets the timer 5A and makes it start timing. The CPU 3A determines whether or not the distance-calculation signal has been returned by the mobile device 2 within a predetermined time (t3) (S105). The transmitter 7A performs ASK modulation on the distance-calculation signal with carrier waves of 125 kHz frequency (FIG. 5, ASK(1)). The distance-calculation signal, ASK-modulated by the transmitter 7A, is transmitted via the transmitting antenna 9A (FIG. 4, vehicle-mounted device 1A distance-calculation signal). At this time, if it is determined that the distance-calculation signal, demodulated by the receiver 8A, has not been returned within the above mentioned predetermined time (t3) from when the distance-calculation signal was transmitted, the CPU 3A again transmits the distance-calculation signal. In addition, as described above, the timer 5A is reset and made to start timing, and the counter 4A is reset and made to start a count. Moreover, this distance-calculation signal is not restricted to the wave form (distance-calculation signal (transmitted)) illustrated in FIG. 5. To enhance security, for example, the content of the signal may be varied each time it is transmitted by the CPU 3A (that is, the waveform describing the distance-calculation signal varies), or the signal content may be varied every fixed period of time.

If the CPU 11 determines that the intra-area confirmation signal A has not been transmitted within the predetermined time (t2), it puts the inverter 21 into an operational state (S203, FIG. 4, inverter 21).

In this way, if the wearer moves outside the communication-feasible range where the intra-area confirmation signal A from the vehicle-mounted device 1A can be received, the doors of the vehicle are locked.

For example, when the wearer exits the communication-feasible range and moves away a distance such that the vehicle is out of visible contact, an intermediary X (not illustrated) moves in between the vehicle and the wearer, and a relay unit A is arranged so that the communication range of the relay unit A (solid line circle E in FIG. 6) intersects the communication range of the vehicle-mounted device 1A (chain double-dashed line circle in FIG. 6), the communication range of the vehicle-mounted device 1C (dashed line circle in FIG. 6), the communication range of the vehicle-mounted device 1D (solid line circle in FIG. 6), and the communication range of the mobile device 2 (not illustrated). In this way, the relay device A can receive signals from the vehicle-mounted devices 1A, 1C and 1D, and the mobile device 2. The intermediary x intends to steal the vehicle (a relay-attack will take place). Furthermore, since the communication range of the vehicle-mounted device 1B (alternate long and short dash line circle in FIG. 6) does not intersect the communication range of the relay device A (solid line circle E in FIG. 6), the signal from the vehicle-mounted device 1B is not transmitted to the mobile device 2.

Operations of the vehicle-mounted device 1A and of the relay device A are explained below; however, operations of the vehicle-mounted devices 1C and 1D are similar.

When the relay device A, for which communication with the vehicle-mounted device 1A is possible, receives the distance-calculation signal from the vehicle-mounted device 1A, it detects the distance-calculation signal and amplifies it (ASK(2) in FIG. 5). The relay device A transmits the distance-calculation signal ASK(2). At this time, since the communication distance of the distance-calculation signal ASK(2) transmitted by the relay device A is, because the signal has been amplified by the relay device A, greater than the normal communication distance of the distance-calculation signal ASK(1) from the vehicle-mounted device 1A, communication to a longer distance is possible. That is, the relay device A carries out the above described processing that makes the mobile device 2 receive the distance-calculation signal from the vehicle-mounted device 1A.

As a result, the receiving antenna 18 of the mobile device 2 can receive an amplified distance-calculation signal ASK(3) from the relay device A. Moreover, since communication from the vehicle-mounted device 1A to the mobile device 2 is performed with carrier waves at low frequencies of 125 kHz, as described above, a phase difference T3 occurs in the distance-calculation signal ASK(3) that the receiving antenna 18 receives, as illustrated in FIG. 5. The demodulator 24 demodulates the distance-calculation signal ASK(3). At this time, since the inverter 21 is in an operational state, the distance-calculation signal from the relay device A, demodulated by the demodulator 24, is transmitted as it is, to the modulator 25 (S205). The modulator 25 performs FSK modulation on the distance-calculation signal from the demodulator 24 with carrier waves of 312 MHz frequency (FSK(1) in FIG. 5). The distance-calculation signal FSK(1), FSK-modulated by the modulator 25, is transmitted via the transmitting antenna 19 (mobile device 2 distance-calculation signal in FIG. 4).

The relay device A, for which communication with the mobile device 2 is possible as described above, receives an FSK-modulated distance-calculation signal FSK(1) from the mobile device 2. The relay device A detects the FSK-modulated distance-calculation signal FSK(1) and amplifies it (FIG. 5, FSK(2)). The relay device A transmits the distance-calculation signal FSK(2). At this time, since the communication distance of the distance-calculation signal FSK(2) transmitted by the relay device A is, because the signal is amplified by the relay device A, greater than the normal communication distance of the distance-calculation signal FSK(1) from the mobile device 2, communication to a longer distance is possible.

The receiving antenna 10A of the vehicle-mounted device 1A receives an amplified distance-calculation signal FSK(3) from the relay device A. The receiver 8A demodulates the distance-calculation signal FSK(3) (distance-calculation signal (received) in FIG. 5). When the CPU 3A determines that the distance-calculation signal, demodulated by the receiver 8A, has been received (S105, YES), it reads the count value of the counter 4A. Based on the count value, the distance from the vehicle-mounted device 1A to the mobile device 2 is calculated. Furthermore, as described above, in amplifying the distance-calculation signal ASK(1) transmitted by vehicle-mounted device 1A, the relay device A must perform the amplification after detecting the distance-calculation signal ASK(1). In addition, in the communication from the vehicle-mounted device 1A to the mobile device 2, the ASK modulation is performed with carrier waves of 125 kHz frequency and the communication is performed. As a result, the one-cycle length of the distance-calculation signal ASK(1) is longer than that of the distance-calculation signal FSK(1) transmitted by the mobile device 2. That is, since the relay device A performs amplification after detecting the distance-calculation signal ASK(1) of the long one-cycle length, a phase difference T2 (FIG. 5) occurs between the distance-calculation signal ASK(1) and the distance-calculation signal ASK(2). In addition, as described above, carrier waves at the low frequency of 125 kHz are used for communication from the vehicle-mounted device 1A to the mobile device 2. Furthermore, carrier waves at the high frequency of 312 MHz are used for communication from the mobile device 2 to the vehicle-mounted device 1A. Thus, the phase difference in the communication from the mobile device 2 to the vehicle-mounted device 1A is of a level that can be ignored in comparison to the phase difference that occurs in the communication from the vehicle-mounted device 1A to the mobile device 2. As a result, by using the low frequency of 125 kHz, an intentional phase difference T3 (FIG. 5) occurs between the distance-calculation signal transmitted from the CPU 3A to the transmitter 7A and the distance-calculation signal demodulated by the receiver 8A. That is, a phase difference between the distance-calculation signal (transmitted) that the CPU 3A transmits to the transmitter 7A and the distance-calculation signal (received) demodulated by the receiver 8A is T4 (T2+T3). As a result, the count value that the CPU 3A reads, as described above, indicates the phase difference T4. Using the count value, the CPU 3A calculates the distance from the vehicle-mounted device 1A to the mobile device 2. The CPU 3A reads the distance corresponding to the count value, as obtained by experiment and stored as tabular data in the flash memory 6A. Thus, using the count value indicating the phase difference T4, the CPU 3A can calculate the distance from the vehicle-mounted device 1A to the mobile device 2. The CPU 3A transmits the calculated distance information indicating the distance from the vehicle-mounted device 1A to the mobile device 2, to the CPU 90 (S106). In the same way, the CPU 3C transmits the calculated distance information indicating the distance from the vehicle-mounted device 1C to the mobile device 2, to the CPU 90 (S108). In addition, the CPU 3D transmits the calculated distance information indicating the distance from the vehicle-mounted device 1D to the mobile device 2, to the CPU 90 (S109). Moreover, in this implementation, calculating the distance from the vehicle-mounted device 1A to the mobile device 2 by means of the count value of the counter 4A does not imply any limitation. For example, the timer 5A is made to start measuring time when the distance-calculation signal is transmitted from the CPU 3A to the transmitter 7A, and the CPU 3A reads the time measured by the timer 5A when the distance-calculation signal from the mobile device 2 demodulated by the receiver 8A is received. Using the time measured by the timer 5A, the distance from the vehicle-mounted device 1A to the mobile device 2 can be calculated.

Based on the distance information from the vehicle-mounted devices 1A, 1C and 1D, the CPU 90 determines whether or not the mobile device 2 is below the predetermined distance (for example 1 meter) from the vehicle-mounted devices 1A, 1C and 1D (S110). At this time, the CPU 90 determines that the mobile device 2 is not below the predetermined distance from the vehicle-mounted devices 1A, 1C and 1D (S110, NO). This is because, due to the relay device A intervening as described above, the phase difference T2, which under normal circumstances should not occur, has occurred. Thus, the count value indicating the phase difference T4, which the CPU 3A uses to calculate the distance from the vehicle-mounted device 1A to the mobile device 2, is larger than the count value indicating the phase difference T3 for cases where the relay device A does not intervene. That is, the distance from the vehicle-mounted device 1A to the mobile device 2, which the CPU 3A calculates based on the count value indicating the phase difference T4, is longer than the distance calculated based on the count value indicating the phase difference T3. As a result, the CPU 90 determines that the mobile device 2 is not below the predetermined distance from the vehicle-mounted devices 1A. In the same way, the CPU 90 determines that the mobile device 2 is not below the predetermined distance from the vehicle-mounted device 1C. Furthermore, the CPU 90 determines that the mobile device 2 is not below the predetermined distance from the vehicle-mounted device 1D. Moreover, the determination of the distances from the vehicle-mounted devices 1A, 1C and 1D to the mobile device 2 by the CPU 90 is not limited to one time. For example, it is possible to carry out the determination of the distances from the vehicle-mounted devices 1A, 1C and 1D to the mobile device 2 a number of times (3 times in FIG. 4). In this way, it is possible to carry out the determination of the distances from the vehicle-mounted devices 1A, 1C and 1D to the mobile device 2 more reliably.

When the CPU 90 determines that the mobile device 2 is not below the predetermined distance from the vehicle-mounted devices 1A, 1C and 1D, it determines whether or not the time measurement of the timer (not illustrated) has reached a prescribed time (t4) (S111). In cases where the CPU 90 determines that the timer measurement has not reached the prescribed time (t4) (S111, NO), it detects the position of the mobile device 2' corresponding to the distance information from the vehicle-mounted devices 1A, 1C and 1D. Thus, the CPU 90 detects the meeting point of the distances calculated by the CPUs 3A, 3C and 3D (S112). This meeting point of the distances calculated by the CPUs 3A, 3C and 3D is not the real position of the mobile device 2, but rather the position of the mobile device 2' based on the distances calculated by the CPUs 3A, 3C and 3D. In the detailed description of the detection of the position of the mobile device 2' below, if, for example, the actual distance from the vehicle-mounted device 1A to the relay device A is a (chain double-dashed straight line in FIG. 6), and the distance from the relay device A to the mobile device 2 is e (solid straight line in FIG. 6), the distance from the vehicle-mounted device 1A to the mobile device 2 calculated by the CPU 3A is a value B corresponding to a+e. In addition, if the actual distance from the vehicle-mounted device 1C to the relay device A is c (dashed straight line in FIG. 6), the distance from the vehicle-mounted device 1C to the mobile device 2 calculated by the CPU 3C is a value C corresponding to c+e. In addition, if the actual distance from the vehicle-mounted device 1D to the relay device A is d (solid straight line in FIG. 6), the distance from the vehicle-mounted device 1D to the mobile device 2 calculated by the CPU 3D is a value D corresponding to d+e. As illustrated in FIG. 6, with regard to the distances from the relay device A to the vehicle-mounted devices 1A, 1C and 1D, the vehicle-mounted device that is closest to the relay device A is vehicle-mounted device 1D. That is, the distance-calculation signal transmitted by the vehicle-mounted device 1D is most quickly returned by the mobile device 2, via the relay device A, to the vehicle-mounted device 1D. Thus, the phase difference in communication between the vehicle-mounted device 1D and the mobile device 2 is small, and the distance D from the vehicle-mounted device 1D to the mobile device 2 calculated by the CPU 3D is shorter than the distances B and C calculated by the CPUs 3A and 3C. As a result, the position of the mobile device 2' based on the distances calculated by the CPUs 3A, 3C and 3D is closest to the vehicle-mounted device 1D, as illustrated in FIG. 6. The CPU 90 calculates as a detection range the range bounded by the distances A and C, between the mobile device 2' and the vehicle, and calculated by the CPUs 3A and 3C (S113). Furthermore, at this time, it may also be arranged that the CPU 90 calculates map information for the detection range of the mobile device 2' by means of, for example, a global positioning system (GPS). It may also be arranged that the CPU 90 transmits, to the vehicle-mounted devices 1A, 1B, 1C and 1D, the detection signal to which the calculated detection range of the mobile device 2' together with the map information for the detection range has been added. Below, the explanation of the present implementation is where the CPU 90 transmits the detection signal indicating the calculated detection range and the map information for the mobile device 2'.

When the CPU 90 calculates the detection range and the map information for the mobile device 2', it transmits an instruction signal so that an identifying signal is transmitted to the CPUs 3A, 3B, 3C and 3D. The operation of the vehicle-mounted device 1A is explained below; however, the operations of the vehicle-mounted devices 1B, 1C and 1D are similar. Moreover, as described above, since the communication range of the vehicle-mounted device 1B (alternate long and short dashed line circle in FIG. 6) does not intersect the communication range of the relay device A (solid line circle E in FIG. 6), the signal from the vehicle-mounted device 1B is not transmitted to the mobile device 2. When the CPU 3A receives the instruction signal from the CPU 90, it transmits an identifying signal to the transmission unit 7A (S114). The transmitter 7A performs ASK modulation on the identifying signal with carrier waves of 125 kHz frequency. The ASK-modulated identifying signal from the transmitter 7A is transmitted via the transmitting antenna 9A. Moreover, as described above, detection and amplification of the identifying signal are also done by the relay device A, and the signal is transmitted to the mobile device 2.

When the receiving antenna 18 of the mobile device 2 receives the identifying signal amplified by the relay device A, the demodulator 24 demodulates the ASK-modulated identifying signal. When the CPU 11 determines that the identifying signal from the vehicle-mounted device 1A, demodulated by the demodulator 24, has been received (S206, YES), it puts the inverter 21 in a non-operational state (S207, vehicle-mounted device 1A identifying signal in FIG. 4).

Next, the CPU 90 transmits, to the vehicle-mounted devices 1A, 1B, 1C and 1D, a detection signal indicating the calculated detection range of the mobile device 2' and map information for the detection range. When the CPU 3A receives the detection signal from the CPU 90, it transmits the detection signal to the transmission unit 7A (S115). The transmitter 7A performs ASK modulation on the detection signal from the CPU 90 with carrier waves of 125 kHz frequency. The detection signal that has been ASK-modulated by the transmitter 7A, is transmitted via the transmitting antenna 9A. Moreover, as described above, the detection signal is detected and amplified by the relay device A, and the signal is transmitted to the mobile device 2.

When the receiving antenna 18 of the mobile device 2 receives the detection signal amplified by the relay device A, the demodulator 24 demodulates the ASK-modulated detection signal. When the CPU 11 determines that the detection signal from the vehicle-mounted device 1A, demodulated by the demodulator 24, has been received (S208, YES), it transmits, based on the detection signal, a display signal to the monitor 92 so that the monitor 92 displays the detection range and the map information for the mobile device 2'. The monitor 92, which receives the display signal from the CPU 11, displays the detection range and the map information for the mobile device 2' corresponding to the display signal.

In this way, the wearer can be informed of the detection range and the map information for the mobile device 2'. At this time, by means of the detection range and the map information for the mobile device 2' displayed on the monitor 92, the wearer can estimate the position of the relay device A, and can be informed that communication is taking place between the vehicle-mounted devices 1A, 1B, 1C and 1D and the mobile device 2 via the relay device A. Thus it is possible to prevent theft, by the intermediary X, of the vehicle on which the vehicle-mounted devices 1A, 1B, 1C and 1D are installed. Furthermore, according to this implementation, the direction in which the relay device A is intervening can be made known to at least the wearer, by means of the position of the mobile device 2' with respect to the vehicle-mounted devices 1A, 1B, 1C and 1D. Moreover, in the present implementation four vehicle-mounted devices are provided; however, this does not imply any limitation. For example, by providing at least three vehicle-mounted devices which can communicate with the relay device A, it is possible to calculate the detection range of the mobile device 2' by calculating the distance between the mobile device 2 and the three vehicle-mounted devices provided. By using the minimum number of vehicle-mounted devices, the provision of unnecessary vehicle-mounted devices in the vehicle can be avoided, the costs of manufacturing and installing the vehicle-mounted devices can be reduced, and it is possible to reduce the above described processing of the CPU 90.

Furthermore, the CPU 90, which transmits the detection signal to the vehicle-mounted devices 1A, 1B, 1C and 1D, transmits an instruction signal to make the vehicle-mounted devices 1A, 1B, 1C and 1D again transmit the distance-calculation signal. The operation of the vehicle-mounted device 1A is explained below; however, the operations of the vehicle-mounted devices 1B, 1C and 1D are similar. According to the instruction signal, the CPU 3A again transmits a distance-calculation signal. At this time, the CPU 3A resets the counter 4A, and starts a count by the counter 4A from the rising edge of the distance-calculation signal. The reason the CPU 3A again transmits the distance-calculation signal to the transmitter 7A is so that the CPU 3A will calculate more reliably the distance from the vehicle-mounted device 1A to the mobile device 2. Without determining that it is below the predetermined distance (S110, NO), when the CPU 90 determines that the prescribed time (t4) has been reached (S111, YES), it stops communication with the mobile device 2 (S116). Moreover, in the present implementation, without the CPU 90 determining that the distance is not below the predetermined distance, when it determines that the prescribed time has been reached, it stops communication with the mobile device 2; however, this does not imply any limitation. For example, an alarm (not illustrated) may be provided to issue an alarm to the mobile device 2. If the CPU 90 determines that the distances are not below the predetermined distance, it transmits an instruction signal to the vehicle-mounted devices 1A, 1B, 1C and 1D so that the alarm transmits an alarm signal to issue an alarm. A configuration may be provided so that the alarm issues an alarm, based on the alarm signal transmitted to the mobile device 2 via the relay device A. If this is done, the wearer can be made aware that the intermediary X is intervening, and it is possible to improve the security aspects. Furthermore, even if the wearer returns again to the communication-feasible range, since communication between the vehicle-mounted devices 1A, 1B, 1C and 1D and the mobile device 2 is stopped, the doors are not unlocked. In such cases, the wearer unlocks the door by inserting a key into the key hole. At this time, the controller (not illustrated) receives a signal indicating that the door has been unlocked by means of a key being inserted into the key hole. In response to this signal, the controller transmits an instruction signal to the CPU 90 so that the vehicle-mounted devices 1A, 1B, 1C and 1D start communication with the mobile device 2. The CPU 90, when it receives the instruction signal, transmits a start-communication instruction signal to the vehicle-mounted devices 1A, 1B, 1C and 1D. The CPUs 3A, 3B, 3C and 3D that receive the start-communication instruction signal from the CPU 90 (S117, YES) re-start communication with the mobile device 2, according to the start-communication instruction signal.

Figure 7:
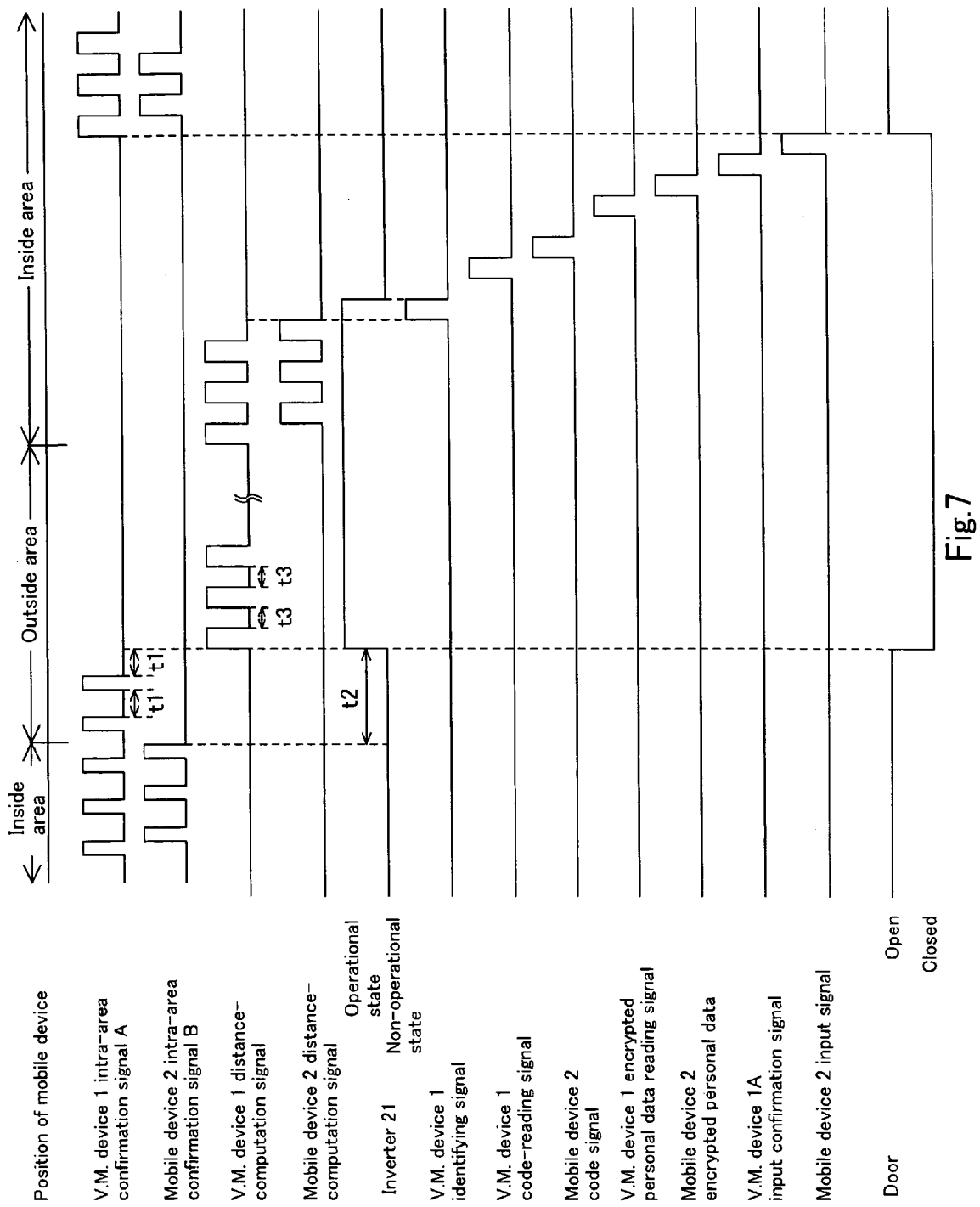
FIG. 7 is a timing chart illustrating an example of the operation of the position detection system, the position detection communication device and the partner communication device, and the communication device and the partner communication device, related to the present invention.
Figure 8:
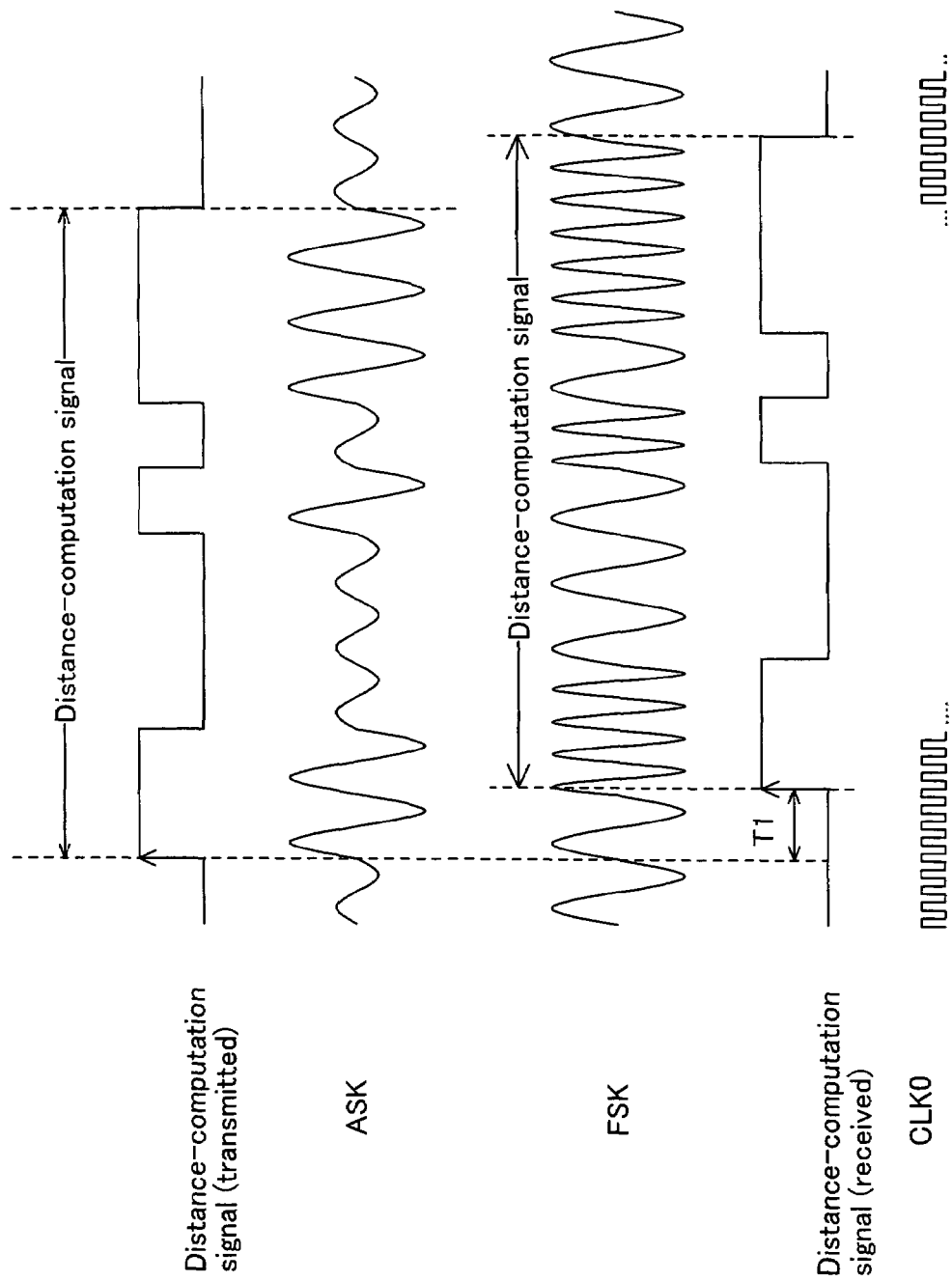
FIG. 8 illustrates variations in the distance-calculation signal.
Figure 9:
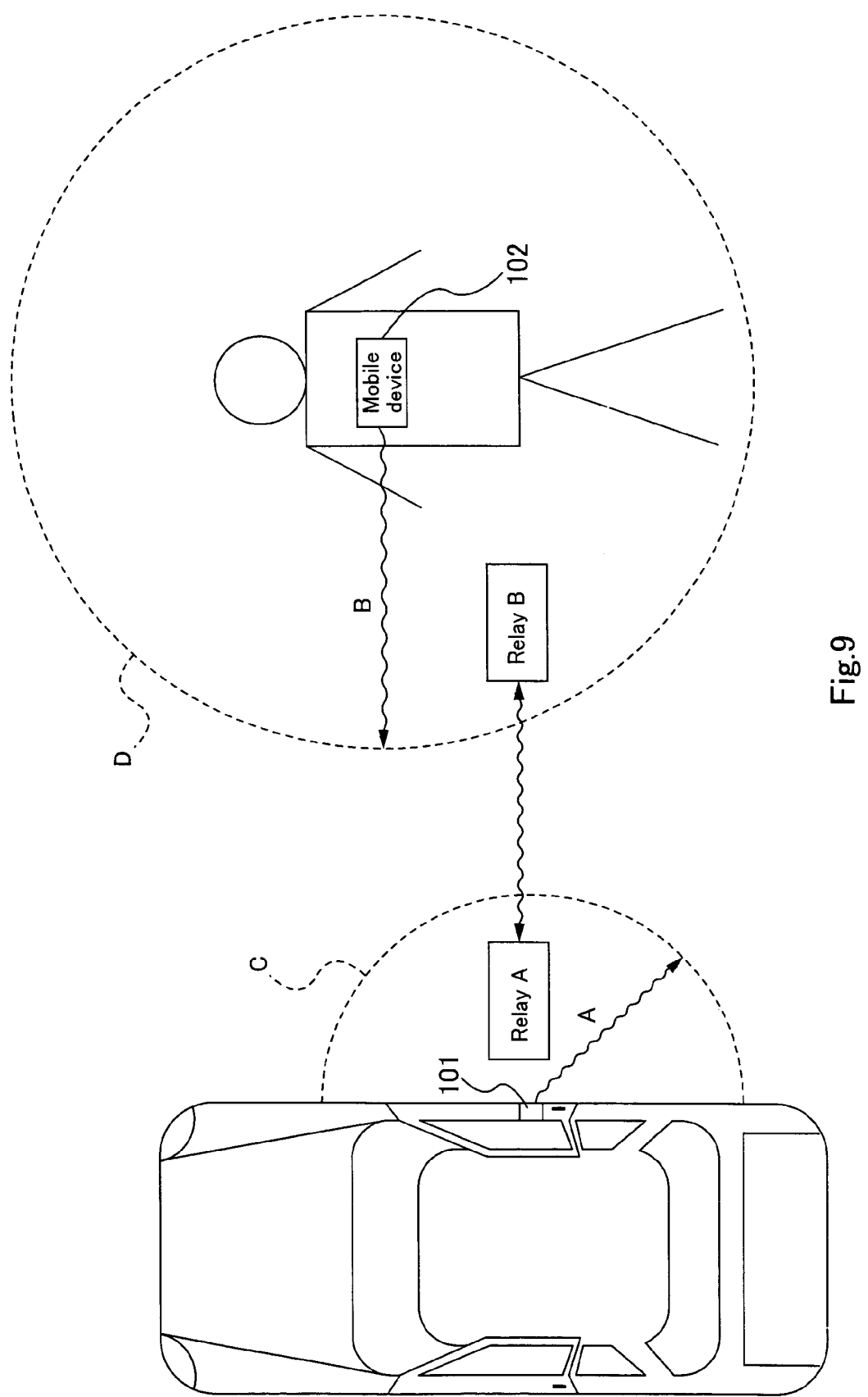
FIG. 9 illustrates communication between a vehicle-mounted device 101 and a mobile device 102, via relay devices A and B.

Below, referring to FIGS. 1 through 8, operations of the above described position detection system, the position detection communication device, and the communication device are explained for cases where the relay device A does not intervene, and where the wearer exits the communication-feasible range but returns again to within the communication-feasible range. FIG. 7 is a timing chart illustrating an example of the operations of the position detection system, the position detection communication device and a partner communication device, and the communication device and a partner communication device, related to the invention. FIG. 8 is a diagram illustrating variations in the distance-calculation signal. Furthermore, FIG. 7 illustrates cases where signals noted in the left-hand column are transmitted when being at high level. In actuality, signals to be transmitted from the vehicle-mounted devices 1A, 1B, 1C and 1D to the mobile device 2 are ASK-modulated by the transmitters 7A, 7B, 7C and 7D, and signals to be transmitted from the mobile device 2 to the vehicle-mounted devices 1A, 1B, 1C and 1D are FSK-modulated by the modulation unit 25. In addition, a high-level single emission of the distance-calculation signal of the vehicle-mounted device 1A (left-hand column of FIG. 7), for convenience, represents the wave form of the distance-calculation signal (transmitted) (left-hand column of FIG. 8).

Moreover, the description of the wearer exiting the communication-feasible range and the doors of the vehicle being locked is as described above. Furthermore, the operation of the vehicle-mounted device 1A is explained; however, the operations of the vehicle-mounted devices 1B, 1C and 1D are similar.

When the wearer returns to within the communication-feasible range (within area, right-hand side of FIG. 7), the receiving antenna 18 of the mobile device 2 receives the ASK-modulated distance-calculation signal (ASK, in FIG. 8) from the vehicle-mounted device 1A. The demodulator 24 demodulates the ASK-modulated distance-calculation signal. At this time, since the inverter 21 is in an operational state, the distance-calculation signal from the vehicle-mounted device 1A, demodulated by the demodulator 24, is transmitted as it is, to the modulator 25 (S205). The modulator 25 performs FSK modulation on the distance-calculation signal from the demodulator 24 with carrier waves of 312 MHz frequency (FSK in FIG. 5). The distance-calculation signal, that has been FSK-modulated by the modulator

25, is transmitted via the transmitting antenna 19 (mobile device 2 distance-calculation signal in FIG. 7).

When the receiving antenna 10A of the vehicle-mounted device 1A receives the FSK-modulated distance-calculation signal, the receiver 8A demodulates the FSK-modulated distance-calculation signal (distance-calculation signal (received) in FIG. 8). When the distance-calculation signal from the mobile device 2, demodulated by the receiver 8A, is determined to have been received (S105, YES), the CPU 3A reads the count value of the counter 4A. Based on the count value, the CPU 3A calculates the distance from the vehicle-mounted device 1A to the mobile device 2. Moreover, carrier waves at the low frequency of 125 kHz are used for the communication from the vehicle-mounted device 1A to the mobile device 2, as described above. Furthermore, carrier waves at a high frequency of 312 MHz are used for the communication from the mobile device 2 to the vehicle-mounted device 1A. Thus, the phase difference in the communication from the mobile device 2 to the vehicle-mounted device 1A is of a level that can be ignored in comparison to the phase difference that occurs in the communication from the vehicle-mounted device 1A to the mobile device 2. As a result, by using the low frequency of 125 kHz, an intentional phase difference T1 (FIG. 8) occurs between the distance-calculation signal transmitted from the CPU 3A to the transmitter 7A and the distance-calculation signal demodulated by the receiver 8A. Thus, the count value that the CPU 3A reads as described above indicates the phase difference T1. The CPU 3A reads the distance corresponding to the count value, as obtained by experiment and stored as tabular data in the flash memory 6A. Thus, using the count value indicating the phase difference T1, the CPU 3A can calculate the distance from the vehicle-mounted device 1A to the mobile device 2. The CPU 3A transmits the calculated distance information indicating the distance from the vehicle-mounted device 1A to the mobile device 2, to the CPU 90 (S106). In the same way, the CPU 3B transmits the calculated distance information indicating the distance from the vehicle-mounted device 1B to the mobile device 2, to the CPU 90 (S107). In the same way, the CPU 3C transmits the calculated distance information indicating the distance from the vehicle-mounted device 1C to the mobile device 2, to the CPU 90 (S108). In addition, the CPU 3D transmits the calculated distance information indicating the distance from the vehicle-mounted device 1D to the mobile device 2, to the CPU 90 (S109).

Based on the distance information from the vehicle-mounted devices 1A, 1B, 1C and 1D, the CPU 90 determines whether or not the mobile device 2 is below the predetermined distance from the vehicle-mounted devices 1A, 1B, 1C and 1D (S110). In this case, since a relay device A is not intervening in the communication between the vehicle-mounted devices 1A, 1B, 1C and 1D and the mobile device 2, the CPU 90 determines that the mobile device 2 is below the predetermined distance from the vehicle-mounted devices 1A, 1B, 1C and 1D (S110, YES). The CPU 90 transmits an instruction signal to make the CPUs 3A, 3B, 3C and 3D transmit the identifying signal. When the CPU 3A receives the instruction signal from the CPU 90, it transmits the identifying signal to the transmission unit 7A (S118). The transmitter 7A performs ASK modulation on the identifying signal with carrier waves of 125 kHz frequency. The identifying signal, ASK-modulated by the transmitter 7A, is transmitted via the transmitting antenna 9A (vehicle-mounted device 1A identifying signal in FIG. 7).

When the receiving antenna 18 of the mobile device 2 receives the ASK-modulated identifying signal, the demodulator 24 demodulates the ASK-modulated identifying signal. When the CPU 11 determines that the identifying signal from the vehicle-mounted device 1A, demodulated by the demodulator 24, has been received (S206, YES), it puts the inverter 21 in a non-operational state (S207, inverter 21 in FIG. 7).

Next, the CPU 3A of the vehicle-mounted device 1A transmits a code-reading signal to the transmission unit 7A (S119). The CPU 3A determines whether or not the code signal from the mobile device 2, demodulated by the receiver 8A, has been received (S120). The transmitter 7A performs ASK modulation on the code-reading signal with carrier waves of 125 kHz frequency. The code-reading signal, ASK-modulated by the transmitter 7A, is transmitted via the transmitting antenna 9A (vehicle-mounted device 1A code-reading signal in FIG. 7).

When the receiving antenna 18 of the mobile device 2 receives the ASK-modulated code-reading signal, the demodulator 24 demodulates the ASK-modulated code-reading signal. When the CPU 11 determines that the code-reading signal from the vehicle-mounted device 1A, demodulated by the demodulator 24, has been received (S210, YES), it reads the code signal from the flash memory 13. The CPU 11 transmits the code signal to the modulator 25 (S211). The modulator 25 performs FSK modulation on the code signal from the CPU 11 with carrier waves of 312 MHz frequency. The code signal, that has been FSK-modulated by the modulator 25, is transmitted via the transmitting antenna 19 (mobile device 2 code signal in FIG. 7).

When the receiving antenna 10A of the vehicle-mounted device 1A receives the FSK-modulated code signal, the receiver 8A demodulates the FSK-modulated code signal. When the CPU 3A determines that the code signal from the mobile device 2, demodulated by the receiver 8A, has been received (S120, YES), it reads the code signal from the flash memory 6A for verifying the code signal of the mobile device 2. The CPU 3A determines whether or not the code signal from the mobile device 2 and the code signal from the flash memory 6A have a prescribed relationship (S121). If the CPU 3A determines that the code signal from the mobile device 2 and the code signal from the flash memory 6A have a prescribed relationship (S121, YES) it transmits an encrypted personal data reading signal to the transmitter 7A (S122). The CPU 3A determines whether or not the encrypted personal data from the mobile device 2, demodulated by the receiver 8A, has been received (S123). The transmitter 7A performs ASK modulation on the encrypted personal data reading signal with carrier waves of 125 kHz frequency. The encrypted personal data reading signal, that has been ASK-modulated by the transmitter 7A, is transmitted via the transmitting antenna 9A (vehicle-mounted device 1A encrypted personal data reading signal in FIG. 7).

When the receiving antenna 18 of the mobile device 2 receives the ASK-modulated encrypted personal data-reading signal, the demodulator 24 demodulates the ASK-modulated encrypted personal data-reading signal. When the CPU 11 determines that the encrypted personal data-reading signal, demodulated by the demodulator 24, has been received (S212, YES), it reads the encrypted personal data from the flash memory 13. The CPU 11 transmits the encrypted personal data to the modulator 25 (S213). The modulator 25 performs FSK modulation on the encrypted personal data from the CPU 11 with carrier waves of 312 MHz frequency. The encrypted personal data, that has been FSK-modulated by the modulator 25, is transmitted via the transmitting antenna 19 (mobile device 2 encrypted personal data in FIG. 7).

When the receiving antenna 10A of the vehicle-mounted device 1A receives the FSK-modulated encrypted personal data, the receiver 8A demodulates the FSK-modulated encrypted personal data. When the CPU 3A determines that the encrypted personal data from the mobile device 2, that has been demodulated by the receiver 8A, has been received (S123, YES), it carries out decryption of the encrypted personal data according to the encryption-decryption program stored in the flash memory 6A (S124). When the decryption of the encrypted personal data from the mobile device 2 has been completed (hereinafter encrypted personal data after decrypted is referred to as decrypted personal data), the CPU 3A reads the personal data stored in the flash memory 6A. The CPU 3A determines whether or not the decrypted personal data and the personal data from the flash memory 6A match (S125). If the CPU 3A determines that the decrypted personal data and the personal data from the flash memory 6A match (S125, YES), it transmits an input confirmation signal to the transmitter 7A (S126). The CPU 3A determines whether or not the input signal from the mobile device 2, demodulated by the receiver 8A, has been received (S127). The transmitter 7A performs ASK modulation on the input confirmation signal with carrier waves of 125 kHz frequency. The input confirmation signal, that has been ASK-modulated by the transmitter 7A, is transmitted via the transmitting antenna 9A (vehicle-mounted device 1A input confirmation signal in FIG. 7).

When the receiving antenna 18 of the mobile device 2 receives the ASK-modulated input confirmation signal, the demodulator 24 demodulates the ASK-modulated input confirmation signal. When the CPU 11 determines that the input confirmation signal, that has been demodulated by the demodulator 24, has been received (S214, YES), it reads information stored in the flag 23. Regarding the information stored in the flag 23 at this time, in cases where the wearer wishes to unlock the door on the driver-seat side, as described above, the wearer inputs an instruction signal to the input unit 12 by switching the switch (not illustrated) to one side, and according to the instruction signal to the input unit 12, the information stored in the flag 23 at this time is "1". Alternatively, where the wearer wishes to unlock all doors of the vehicle, as described above, the wearer inputs an instruction signal to the input unit 12 by switching the switch (not illustrated) to the other side, and according to the instruction signal to the input unit 12, the information stored in the flag 23 is "0". The present implementation is explained below with, for example, "1" stored in the flag 23. The CPU 11 transmits to the modulator 25 the input signal corresponding to "1" stored in the flag 23 (S215). The modulator 25 performs FSK modulation on the input signal from the CPU 11 with carrier waves of 312 MHz frequency. The input signal, that has been FSK-modulated by the modulator 25, is transmitted via the transmitting antenna 19 (mobile device 2 input signal in FIG. 7).

When the receiving antenna 10A of the vehicle-mounted device 1A receives the FSK-modulated input signal, the receiver 8A demodulates the FSK-modulated input signal. When the CPU 3A determines that the input signal from the mobile device 2, demodulated by the receiver 8A, has been received (S127, YES), it determines whether or not the input signal is "1" (S128). If the CPU 3A determines that the input signal is "1" (S128, YES), it transmits to the CPU 90 an instruction signal to unlock the door on the driver-seat side of the vehicle only. When the CPU 90 receives the instruction signal from, for example, all the vehicle-mounted devices 1A, 1B, 1C and 1D to unlock the door on the driver-seat side of the vehicle only, it transmits, to the controller (not illustrated), an instruction signal to unlock the door on the driver-seat side of the vehicle only (S129). According to the instruction signal from the CPU 90, the controller unlocks the door on the driver-seat side of the vehicle only. Furthermore, if the CPU 3A determines that the input signal is not "1" (S128, NO), it transmits to the CPU 90 an instruction signal to unlock all the doors of the vehicle. When the CPU 90 receives an instruction signal from, for example, all the vehicle-mounted devices 1A, 1B, 1C and 1D to unlock all the vehicle doors, it transmits, to the controller, an instruction signal to unlock all the doors of the vehicle (S130). According to the instruction signal, the controller unlocks all the doors of the vehicle.

In this way, the mobile device 2 is within the communication-feasible range; the distances from the vehicle-mounted devices 1A, 1B, 1C and 1D to the mobile device 2 are calculated from the distance-calculation signals that the CPUs 3A, 3B, 3C and 3D transmit to the transmitters 7A, 7B, 7C and 7D and the distance-calculation signals from the mobile device 2 that have been demodulated by the receivers 8A, 8B, 8C and 8D; and if the CPU 90 determines that these distances are below the predetermined distance, all the doors of the vehicle or the door on the driver-seat side are unlocked by the controller.

According to the above described implementation, in cases where the CPU 90 determines that the multiple distances between the vehicle-mounted devices 1A, 1B, 1C and 1D and the mobile device 2 are at or above the predetermined distance, it is possible to detect the position of the relay device A that enables communication between the vehicle-mounted devices 1A, 1B, 1C and 1D and the mobile device 2. That is, it is possible to detect the position of the relay device A which makes communication possible between the vehicle-mounted devices 1A, 1B, 1C and 1D and the mobile device 2, irrespective of the fact that due to the multiple distances between the vehicle-mounted devices 1A, 1B, 1C and 1D and the mobile device 2 being at or above the predetermined distance, under normal circumstances communication is not possible.

In addition, it is possible to return the distance-calculation signals from the vehicle-mounted devices 1A, 1B, 1C and 1D, as they are, to the inverter 21. As a result, since the CPUs 3A, 3B, 3C and 3D calculate the distances between the vehicle-mounted devices 1A, 1B, 1C and 1D and the mobile device 2 from the transmitted distance-calculation signals and the distance-calculation signals returned by the mobile device 2, which are the same as the transmitted distance-calculation signals, it is possible to reliably calculate accurate distances.

In addition, by performing communication from the vehicle-mounted devices 1A, 1B, 1C and 1D to the mobile device 2 with carrier waves of low frequency, it is possible to intentionally produce a phase difference. In addition, by performing communication from the mobile device 2 to the vehicle-mounted devices 1A, 1B, 1C and 1D with carrier waves of high frequency, it is possible to have a phase difference of a level that can be ignored in comparison to the phase difference produced in the communication from the vehicle-mounted devices 1A, 1B, 1C and 1D to the mobile device 2. That is, by means of the phase difference intentionally produced in the communication from the vehicle-mounted devices 1A, 1B, 1C and 1D to the mobile device 2, the CPUs 3A, 3B, 3C and 3D can calculate the multiple distances from the vehicle-mounted devices 1A, 1B, 1C and 1D to the mobile device 2.

In addition, by the CPUs 3A, 3B, 3C and 3D varying the distance-calculation signal pattern every prescribed number of times it is generated, it is possible to improve security aspects against an individual reading the distance-calculation signal by means of, for example, a reading device or the like. Furthermore, since the CPUs 3A, 3B, 3C and 3D repeatedly transmit the distance-calculation signal until the distance-calculation signal returned by the inverter 21 is received, the CPUs 3A, 3B, 3C and 3D can reliably perform calculation of the multiple distances between the vehicle-mounted devices 1A, 1B, 1C and 1D and the mobile device 2.

In addition, in the communication from the vehicle-mounted devices 1A, 1B, 1C and 1D to the mobile device 2 with carrier waves of low frequency, by using ASK-modulation suitable for carrier waves of low frequency, the circuits can be easily configured, and it is possible to perform transmission from the vehicle-mounted devices 1A, 1B, 1C and 1D to the mobile device 2 even when there is a certain amount of interference. In the communication from the mobile device 2 to the vehicle-mounted devices 1A, 1B, 1C and 1D with carrier waves of high frequency, by using FSK-modulation suitable for carrier waves of high frequency, the effects of noise can be reduced, and it is possible to reliably transmit information, without losses, from the mobile device 2 to the vehicle-mounted devices 1A, 1B, 1C and 1D.

In addition, by performing communication from the vehicle-mounted devices 1A, 1B, 1C and 1D to the mobile device 2, and from the mobile device 2 to the vehicle-mounted devices 1A, 1B, 1C and 1D, in spread spectrum, it is possible to improve the confidentiality of the signals transmitted in spread spectrum, and to greatly enhance abilities to exclude jamming waves and interference waves.

Moreover, by using timers 5A, 5B, 5C and 5D for calculating the phase difference, counters 4A, 4B, 4C and 4D for counting at a prescribed clock frequency, and flash memories 6A, 6B, 6C and 6D for storing information based on which the CPUs 3A, 3B, 3C and 3D calculates the distances between the vehicle-mounted devices 1A, 1B, 1C and 1D and the mobile device 2 from the count values, the CPUs 3A, 3B, 3C and 3D can reliably perform the calculation of the multiple distances between the vehicle-mounted devices 1A, 1B, 1C and 1D and the mobile device 2. Further, by each timer and each counter being reset each time the CPUs 3A, 3B, 3C and 3D transmit a distance-calculation signal, the CPUs 3A, 3B, 3C and 3D can reliably calculate the multiple distances between the vehicle-mounted devices 1A, 1B, 1C and 1D and the mobile device 2, from the distance-calculation signals when transmitted by the CPUs 3A, 3B, 3C and 3D and the distance-calculation signals when received, that are the same as the distance-calculation signals transmitted by the CPUs 3A, 3B, 3C and 3D.

Moreover, when the CPU 90 determines that the multiple distances to the mobile device 2, calculated by the CPUs 3A, 3B, 3C and 3D, are greater the predetermined distance, it is possible to operate an alarm (not illustrated) and issue an alarm. Therefore, when the CPU 90 makes the above mentioned determination, it is possible to make the wearer aware of the fact that the communication is being carried out between the vehicle-mounted devices 1A, 1B, 1C and 1D and the mobile device 2 via the relay device A.

Moreover, when the CPU 90 determines that the multiple distances to the mobile device 2 calculated by the CPUs 3A, 3B, 3C and 3D are at or above the predetermined distance, it is possible to display the position of the mobile device 2' on the monitor 92. Therefore, when the CPU 90 makes the above mentioned determination, it is possible to make known the fact that the communication is being carried out between the vehicle-mounted devices 1A, 1B, 1C and 1D and the mobile device 2 via the relay device A, as well as the position of the mobile device 2'.

Furthermore, in cases where the CPU 90 determines that the multiple distances between the vehicle-mounted devices 1A, 1B, 1C and 1D and the mobile device 2 calculated by the CPUs 3A, 3B, 3C and 3D are greater the predetermined distance, it is possible to stop the communication with the mobile device 2. As a result, even if, for example, communication is carried out by means of the relay device A intervening between the vehicle-mounted devices 1A, 1B, 1C and 1D and the mobile device 2, it is possible to stop the communication with the mobile device 2, after the CPU 90 makes the determination described above.

In addition, it is possible to calculate the multiple distances between the vehicle-mounted devices 1A, 1B, 1C and 1D and the mobile device 2, and when the CPU 90 determines that the multiple distances are below the predetermined distance, it is possible to unlock the doors of the vehicle. Furthermore, when the CPU 90 determines that the multiple distances are at or above the predetermined distance, it is possible to lock the doors of the vehicle. That is, it is possible to unlock or lock the doors of the vehicle depending on the determining result of the CPU 90, without inserting a key (the vehicle key) into a keyhole.

==Other Implementations==

The detection of the position of the relay device A with the position detection system, the position detection communication device and the communication device, related to the invention, have been explained above; however, the above explanation was provided so that the present invention could be easily understood and should not be construed as limiting the invention. Without departing from the spirit of the invention, modifications and improvements may be carried out.

<<Other Implementations of Position Detection System, Position Detection Communication Device, and Communication Device>>

The vehicle-mounted devices 1A, 1B, 1C and 1D are installed at the above described positions in the vehicle in the present implementation; however, this should not be construed as a limitation.

For example, in the positions where the vehicle-mounted devices 1A, 1B, 1C and 1D are installed, the receiver 8A and receiving antenna 10A, the receiver 8B and receiving antenna 10B, the receiver 8C and receiving antenna 10C, and the receiver 8D and receiving antenna 10D, only, may be installed. In such cases, one vehicle-mounted device configured with a transmitter, a transmitting antenna, an OSC, a flash memory, a timer and a counter, may be installed and the control may be integrated in the CPU 90. The distance-calculation signal from the CPU 90 as described above is transmitted from the transmitting antenna via a transmitter. The CPU 90 calculates in, for example, the order in which the receivers 8A, 8B, 8C and D8 received via the receiving antennas 10A, 10B, 10C and 10D, the distance-calculation signals returned by the mobile device 2, the distances from the antennas that receive these distance-calculation signals, to the mobile device 2' (mobile device 2, in cases where there is no relay-attack). An arrangement may be made so that, based on calculated information concerning each of the distances from the receiving antennas 10A, 10B, 10C and 10D to the mobile device 2, the CPU 90 calculates the detection range and map information for the mobile device 2'.

<<Applications of Position Detection System, Position Detection Communication Device, and Communication Device>>

The present implementation uses the position detection system, the position detection communication device, and the communication device in a vehicle on which passive keyless entry system functions are installed; however, this should not be construed as limiting the applications of the invention.

A person whose location has to be identified (for example, a nursery school pupil or an elderly person; hereinafter referred to as the monitored-object) is given the mobile device 2 to carry, and a person who is monitoring the monitored-object (hereinafter referred to as the monitor) controls a monitoring device having the same functions as the vehicle-mounted device 1A. By means of the monitoring device determining whether or not an intra-area confirmation signal B has been transmitted by the mobile device 2, based on an intra-area confirmation signal A from the monitoring device, the monitor can judge whether or not the monitored-object is within the communication-feasible range. When the monitoring device determines that the intra-area confirmation signal B, from the mobile device 2 that the monitored-object carries, has not been transmitted by the mobile device 2, the monitor is made aware that the monitored-object has exited the communication-feasible range by, for example, the monitoring device sounding an alarm. Thus, it is possible for the monitor to promptly take action to protect the monitored-object. Furthermore, it may be arranged that an identifying code be stored in the flash memory 13 of the mobile device 2 carried by each monitored-object, and that the identifying code be transmitted together with the intra-area confirmation signal B by the mobile device 2. By so doing, the monitor can grasp which of the monitored-objects has exited the communication-feasible range. In addition, a plurality of monitoring devices as described above, having similar functions to the vehicle-mounted devices 1A, 1B, 1C and 1D may provided. The intra-area confirmation signals A are transmitted by plurality of the monitoring devices. For cases where the monitored-object exits the communication-feasible range, the direction in which the monitored-object exited the communication-feasible range can be easily made known to the monitor, based on the intra-area confirmation signals B received by plurality of the monitoring devices just before the monitored-object exited the communication-feasible range. This is because plurality of the monitoring devices determine whether or not the intra-area confirmation signals B were transmitted within a predetermined time t1 after the intra-area confirmation signal A was transmitted. As a result, the intra-area confirmation signals B are transmitted most quickly to the monitoring device closest to the monitored-object. Thus, it is possible to determine the direction in which the monitored-object exited from the communication-feasible range, by means of the monitoring device closest to the monitored-object. On this account, the monitor can search for the monitored-object more assuredly. Thus, accidents due to the monitored-object exiting from the communication-feasible range can be prevented from occurring. In addition, for cases where the monitored-object exits the communication-feasible range, plurality of the monitoring devices determine that the intra-area confirmation signals B from the mobile device 2 are not being transmitted, and they transmit a distance-calculation signal. If there is a relay device between the mobile device 2 and plurality of the monitoring devices, the distance-calculation signal is returned via the relay device to plurality of the monitoring devices. Plurality of the monitoring devices calculate the detection range for the above mentioned mobile device 2' from the phase difference between the distance-calculation signal when transmitted and the distance-calculation signal from the mobile device 2. From the calculated detection range of the mobile device 2', the position of the relay device can be predicted, and it is possible to prevent, for example, kidnapping or the like, of the monitored-object by the wearer of the relay device.

Moreover, the mobile device 2 may, for example, be used as a house key. A plurality of managing devices having functions similar to the vehicle-mounted devices 1A, 1B, 1C and 1D may be arranged at the door of a house. For cases where a relay device lies between the mobile device 2 and plurality of the managing devices, a controller that performs integrated control of plurality of the management devices determines that the distance, calculated by plurality of the management devices, between the mobile device 2 and the management devices is not below the predetermined distance. As a result, the controller stops communication with the mobile device 2. Thus, security aspects can be improved and it is possible to prevent damage due to a burglar or the like, attempting to break into the house via the relay device. In the same way, the implementation may be applied to entry of buildings other than houses and the like.

What is claimed is:

1. A position detection system for detecting a relay device, comprising:
  a plurality of first communication devices, each of plurality of the first communication devices including
    a first transmitter for transmitting a distance-calculation signal for calculating distance to a second communication device,
    a detector for detecting, by receiving from the second communication device a signal corresponding to the distance-calculation signal, phase difference between the distance-calculation signal when transmitted and the signal corresponding to the distance-calculation signal when received, and
    a calculator for calculating the distance to the second communication device, based on the phase difference detected by the detector;
  the second communication device including
    a second transmitter for transmitting the signal corresponding to the distance-calculation signal transmitted by plurality of the first communication devices;
  a determining unit for determining whether or not the multiple distances to the second communication device, calculated by plurality of the calculators of plurality of the first communication devices, are below a predetermined distance; and
  a position detector for detecting the position of the relay device corresponding to the multiple distances on the basis of the determining result when the determining unit has determined that the multiple distances to the second communication device, calculated by plurality of the calculators of plurality of the first communication devices, are at or above the predetermined distance, wherein
  in a state where communication between plurality of the first communication devices and the second communication device is not possible due to multiple distances between plurality of the first communication devices and the second communication device being at or above the predetermined distance, enables communication between plurality of the first communication devices and the second communication device.

2. The position detection system as recited in claim 1, wherein
the second communication device further includes a returning unit for returning the distance-calculation signal transmitted by plurality of the first communication devices, and
the detector detects, by receiving the distance-calculation signal returned by the returning unit, phase difference between the distance-calculation signal when transmitted and the distance-calculation signal when received.

3. The position detection system as recited in claim 2, each of plurality of the first communication devices further including a generator for generating the distance-calculation signal, wherein
the first transmitter repeatedly transmits the distance-calculation signal generated by the generation unit, until plurality of the first communication devices receive the distance-calculation signal returned by the returning unit, and
the generator varies a pattern of the distance-calculation signal each predetermined number of times the generator generates the distance-calculation signal.

4. The position detection system as recited in claim 2 wherein each of plurality of the first communication devices includes
a timer, that is reset each time the first transmitter transmits the distance-calculation signal, for measuring the time until plurality of the first communication device receives the distance-calculation signal returned by the returning unit,
a counter, that is reset each time the timer is reset, for counting clocks of a prescribed frequency for the phase difference to be detected by the detector, and
a memory for storing information based on which the calculator calculates the distance to the second communication device from a count value of the counter,
wherein the detector detects the time measured by the timer as the phase difference between the distance-calculation signal when transmitted and the distance-calculation signal when received, and the calculator calculates, based on the count value of the counter counting the phase difference at the prescribed clock frequency and on the information stored in the memory, the distance to the second communication device.

5. The position detection system as recited in claim 1, wherein each of plurality of the first communication devices further includes
a first modulator for modulating the distance-calculation signal onto a carrier wave of a first frequency; and
a first demodulator for demodulating the distance-calculation signal from the second communication device, that was modulated onto a carrier wave of a second frequency higher than the first frequency, and
the second communication device further includes
a second demodulator for demodulating the distance-calculation signal from plurality of the first communication devices, modulated by the first modulator, and
a second modulator for modulating the distance-calculation signal, that was demodulated by the second demodulator, onto a carrier wave of the second frequency.

6. The position detection system as recited in claim 5, wherein:
the first modulator ASK-modulates the distance-calculation signal onto a carrier wave of the first frequency,
the second demodulator demodulates the distance-calculation signal from plurality of the first communication devices, that was ASK-modulated by the first modulator,
the second modulator FSK-modulates the distance-calculation signal, that was demodulated by the second demodulator, onto a carrier wave of the second frequency, and
the first demodulator demodulates the distance-calculation signal from the second communication device, that was FSK-modulated by the second modulator.

7. The position detection system as recited in claim 5, wherein
spread spectrum is used for the communication between plurality of the first communication devices and the second communication device,
the first modulator, after first-order-modulating the distance-calculation signal onto the carrier wave of the first frequency, performs second order modulation or spread on the distance-calculation signal first-order-modulated onto the carrier wave of the first frequency,
the second demodulator despreads the distance-calculation signal, from plurality of the first communication devices, that was second-order-modulated or spread by the first modulator thereby demodulating the signal,
the second modulator, after first-order-modulating the distance-calculation signal, that was despread and demodulated by the second demodulator, onto the carrier wave of the second frequency, performs second order modulation or spread on the distance-calculation signal that was first-order-modulated onto the carrier wave of the second frequency, and
the first demodulator despreads the distance-calculation signal, from the second communication device, that was second-order modulated or spread by the second modulator thereby demodulating the signal.

8. The position detection system as recited in claim 1 wherein:
the second communication device includes an alarm for issuing an alarm;
the determining unit transmits an alarm signal so that the alarm issues the alarm, on the basis of the determining result when a determination has been made that the multiple distances to the second communication device calculated by plurality of the calculators of plurality of the first communication devices are at or above the predetermined distance; and
the alarm issues an alarm on the basis of the alarm signal from the determining unit.

9. The position detection system as recited in claim 1 wherein
the second communication device includes a display for displaying the position of the relay device,
the position detector, on the basis of the determining result when the determining unit has determined that the multiple distances to the second communication device, calculated in plurality of the calculators of plurality of the first communication devices, are at or above the predetermined distance, transmits position information indicating the position of the relay device corresponding to the multiple distances, and
the display displays the position of the relay device based on the position information from the position detector.

10. The position detection system as recited in claim 1, wherein plurality of the first communication devices, on the basis of the determining result when the determining unit has determined that the multiple distances to the second communication device, calculated by plurality of the calculators of plurality of the first communication devices, are at or above the predetermined distance, stops communication with the second communication device.

11. The position detection system as recited in claim 1, wherein, plurality of the first communication devices are installed in a vehicle, and the determining unit supplies to a controller that controls unlocking and locking of a door of the vehicle, as a signal to unlock the door, the determining result when the determining unit has determined that the multiple distances to the second communication device, calculated by plurality of the calculators of plurality of the first communication devices, are below the predetermined distance, and, as a signal to lock the door, the determining result when the determining unit has determined that the multiple distances to the second communication device, calculated by plurality of the calculators of plurality of the first communication devices, are at or above the predetermined distance.

12. A position detection system for detecting a relay device, comprising:
 a first communication device, the first communication device including
  a first transmitter for transmitting a distance-calculation signal for calculating distance to the second communication device,
  a plurality of receivers for receiving from the second communication device a signal corresponding to the distance-calculation signal,
  a detector for detecting, by means of plurality of the receivers receiving from the second communication device the signal corresponding to the distance-calculation signal, a plurality of phase differences between the distance-calculation signal when transmitted and the signal corresponding to the distance-calculation signal when received, and
  a calculator for calculating the multiple distances to the second communication device, based on plurality of the phase differences detected by the detector;
 the second communication device comprising:
  a second transmitter for transmitting the signal corresponding to the distance-calculation signal transmitted by the first communication device;
 the position detection system further comprising:
  a determining unit for determining whether or not the multiple distances to the second communication device, calculated by the calculator, are below a predetermined distance; and
  a position detector for detecting the position of the relay device corresponding to the multiple distances on the basis of the determining result when the determining unit has determined that the multiple distances to the second communication device, calculated by the calculator, are at or above the predetermined distance, wherein
  in a state where communication between the first communication device and the second communication device is not possible due to the multiple distances between the first communication device and the second communication device being at or above the predetermined distance, enables communication between the first communication device and the second communication device.

13. A position detection method for a position detection system for detecting a relay device, comprising:
 transmitting by means of each of a plurality of first communication devices a distance-calculation signal for calculating distance to a second communication device;
 transmitting by means of the second communication device a signal corresponding to the distance-calculation signal transmitted by plurality of the first communication devices;
 detecting by means of each of plurality of the first communication devices, by receiving from the second communication device the signal corresponding to the distance-calculation signal, phase difference between the distance-calculation signal when transmitted and the signal corresponding to the distance-calculation signal when received;
 calculating by means of each of plurality of the first communication devices the distance to the second communication device, based on the phase difference;
 determining whether or not the multiple distances to the second communication device, calculated by plurality of the first communication devices, are below a predetermined distance and, when a determination has been made that the multiple distances to the second communication device, calculated by plurality of the first communication devices, are at or above the predetermined distance, detecting the position of the relay device corresponding to the multiple distances, wherein
 in a state where communication between plurality of the first communication devices and the second communication device is not possible due to multiple distances between plurality of the first communication devices and the second communication device being at or above the predetermined distance, enables communication between plurality of the first communication devices and the second communication device.

14. A position detection communication device for detecting a relay device, comprising:
 a plurality of distance-calculation communication devices, each of plurality of the distance-calculation communication device including
  a transmitter for transmitting a distance-calculation signal for calculating distance to the partner communication device,
  a detector for detecting, by receiving from the partner communication device a signal corresponding to the distance-calculation signal, phase difference between the distance-calculation signal when transmitted and the signal corresponding to the distance-calculation signal when received, and
  a calculator for calculating the distance to the partner communication device, based on the phase difference detected by the detector;
 a determining unit for determining whether or not multiple distances to the partner communication device, calculated by plurality of the calculators of plurality of the distance-calculation communication devices, are below a predetermined distance; and
 a position detector for detecting the position of the relay device corresponding to the multiple distances on the basis of the determining result when the determining unit has determined that the multiple distances to the partner communication device, calculated by plurality of the calculators of plurality of the distance-calculation communication devices, are at or above the predetermined distance, wherein
 in a state where communication with a partner communication device is not possible due to the multiple distances to the partner communication device being at or above the predetermined distance, enables communication with the partner communication device.

15. A communication device which can communicate with a partner communication device, the partner communication device having a plurality of distance-calculation communication devices that each transmits a distance-calculation signal to calculate distance; detects, by receiving a signal corresponding to the distance-calculation signal that is returned, phase difference between the distance-calculation signal when transmitted and the signal corresponding to the distance-calculation signal when received; and calculates the distance to the transmission position of the signal corresponding to the distance-calculation signal, based on the phase difference;

the partner communication device which:

in order to detect the position of a relay device that, where reception of the signal corresponding to the distance-calculation signal, from the transmission position, is not possible due to multiple distances, calculated by plurality of the distance-calculation communication devices, being at or above a predetermined distance, enables reception by plurality of the distance-calculation communication devices of the signal corresponding to the distance-calculation signal from the transmission position, determines whether or not the multiple distances calculated by plurality of the distance-calculation communication devices are below the predetermined distance, and detects the position of the relay device corresponding to the multiple distances on the basis of the determining result when the multiple distances calculated by plurality of the distance-calculation communication devices are determined to be at or above the predetermined distance, the communication device comprising:

a transmitter for transmitting the signal corresponding to the distance-calculation signal transmitted by the partner communication device.

* * * * *